US012691879B2

(12) United States Patent
Ko et al.

(10) Patent No.: US 12,691,879 B2
(45) Date of Patent: Jul. 28, 2026

(54) METHOD AND APPARATUS FOR GENERATING VIRTUAL STOP LINE

(71) Applicant: 42DOT INC., Seoul (KR)

(72) Inventors: Chan Ho Ko, Yongin (KR); Jin Soo Yang, Seongnam (KR); Kyu Hwan Yeon, Suwon (KR)

(73) Assignee: 42DOT INC., Seoul (KR)

( * ) Notice: Subject to any disclaimer, the term of this patent is extended or adjusted under 35 U.S.C. 154(b) by 47 days.

(21) Appl. No.: 18/363,054

(22) Filed: Aug. 1, 2023

(65) Prior Publication Data

US 2024/0043006 A1 Feb. 8, 2024

(30) Foreign Application Priority Data

| | | |
|---|---|---|
| Aug. 2, 2022 | (KR) | 10-2022-0095965 |
| Aug. 2, 2022 | (KR) | 10-2022-0095966 |
| Aug. 2, 2022 | (KR) | 102022-0095813 |
| Aug. 3, 2022 | (KR) | 10-2022-0096457 |
| Aug. 23, 2022 | (KR) | 10-2022-0105246 |
| Sep. 29, 2022 | (KR) | 10-2022-0124413 |

(51) Int. Cl.
*B60W 30/18* (2012.01)
*B60W 60/00* (2020.01)

(52) U.S. Cl.
CPC ........ *B60W 30/181* (2013.01); *B60W 60/001* (2020.02); *B60W 2552/53* (2020.02); *B60W 2554/4026* (2020.02); *B60W 2554/4041* (2020.02); *B60W 2554/4049* (2020.02); *B60W 2554/80* (2020.02)

(58) Field of Classification Search
CPC ............ B60W 30/181; B60W 60/001; B60W 2552/53; B60W 2554/4026; B60W 2554/4041; B60W 2554/4049; B60W 2554/80; B60W 30/18109; B60W 2554/4029
USPC ......................................................... 701/25
See application file for complete search history.

(56) References Cited

U.S. PATENT DOCUMENTS

| | | | | |
|---|---|---|---|---|
| 2018/0093668 A1* | 4/2018 | Kim | ...................... | B60W 10/18 |
| 2019/0023239 A1* | 1/2019 | Fujita | ...................... | G08G 1/16 |
| 2019/0171218 A1* | 6/2019 | Hammond | .......... | G05D 1/0223 |
| 2019/0220014 A1* | 7/2019 | Bradley | ................ | G06V 20/58 |
| 2019/0270405 A1* | 9/2019 | Fukumoto | ............... | G08G 1/16 |
| 2020/0208991 A1* | 7/2020 | Chen | ........................ | G06N 3/09 |
| 2020/0247434 A1* | 8/2020 | Kim | ......................... | G08G 1/166 |
| 2021/0064889 A1* | 3/2021 | Iglesias | ................ | G06V 10/273 |
| 2021/0094577 A1* | 4/2021 | Shalev-Shwartz | ......................... B60W 60/001 |
| 2022/0089152 A1* | 3/2022 | Oh | ......................... | B60W 40/04 |
| 2022/0410890 A1* | 12/2022 | Takei | ............. | B60W 30/18163 |
| 2023/0316910 A1* | 10/2023 | Kim | ................. | G08G 1/096725 701/93 |
| 2023/0399014 A1* | 12/2023 | Mehdipour | ........ | B60W 60/0011 |

* cited by examiner

*Primary Examiner* — Ramya P Burgess
*Assistant Examiner* — Preston Jay Miller
(74) *Attorney, Agent, or Firm* — Harvest IP Law, LLP

(57) ABSTRACT

Provided are a method and apparatus for generating a virtual stop line, wherein the method includes determining a target crosswalk from among one or more crosswalks on a driving route, setting a region of interest for the target crosswalk, and determining whether or not to generate a virtual stop line, on the basis of a location of a pedestrian within the region of interest.

10 Claims, 28 Drawing Sheets

METHOD AND APPARATUS FOR GENERATING VIRTUAL STOP LINE

CROSS-REFERENCE TO RELATED APPLICATIONS

This application is based on and claims priority under 35 U.S.C. § 119 to Korean Patent Application Nos. 10-2022-0095965, filed on Aug. 2, 2022, 10-2022-0095813, filed on Aug. 2, 2022, 10-2022-0095966, filed on Aug. 2, 2022, 10-2022-0096457, filed on Aug. 3, 2022, 10-2022-0105246, filed on Aug. 23, 2022, and 10-2022-0124413, filed on Sep. 29, 2022 in the Korean Intellectual Property Office, the disclosure of which is incorporated by reference herein in its entirety.

BACKGROUND

1. Field

The disclosure relates to a method and apparatus for generating a virtual stop line.

2. Description of the Related Art

Due to the convergence of information and communication technology and the vehicle industry, the smartization of vehicles has rapidly progressed. Due to smartization, vehicles have evolved from simple mechanical systems to smart cars, in particular, autonomous driving has attracted attention as a core technology of smart cars. Autonomous driving refers to a technology that allows vehicles to autonomously reach destinations thereof without drivers manipulating steering wheels, accelerator pedals, brakes, or the like.

Various additional functions related to autonomous driving have been continuously developed, and there is a continuous need for research on methods capable of providing safe autonomous driving experiences to passengers and pedestrians by controlling vehicles by recognizing and determining driving environments by using various types of data and on methods for controlling and decelerating vehicles when autonomous vehicles recognize pedestrians.

The foregoing background art is technical information that the inventor has possessed for derivation of the disclosure or has acquired during the derivation process of the disclosure, and may not be necessarily known art disclosed to the general public prior to the filing of the disclosure.

SUMMARY

Provided are a method and apparatus for generating a virtual stop line. The problems to be solved by the disclosure are not limited to the problems mentioned above, and other problems and advantages of the disclosure that are not mentioned may be understood by the following description and more clearly understood by embodiments. In addition, it will be appreciated that the problems and advantages to be solved by the disclosure may be implemented by units and combinations thereof defined in claims.

Additional aspects will be set forth in part in the description which follows and, in part, will be apparent from the description, or may be learned by practice of the presented embodiments of the disclosure.

According to an aspect of the disclosure, a method of generating a virtual stop line includes determining a target crosswalk from among one or more crosswalks on a driving route, setting a region of interest for the target crosswalk, and determining whether or not to generate a virtual stop line, on the basis of a location of a pedestrian within the region of interest.

According to another aspect of the disclosure, an apparatus for generating a virtual stop line includes a memory configured to store at least one program, and a processor operating by executing the at least one program, wherein the processor is configured to determine a target crosswalk from among one or more crosswalks on a driving route, set a region of interest for the target crosswalk, and determine whether or not to generate a virtual stop line, on the basis of a location of a pedestrian within the region of interest.

According to another aspect of the disclosure, a method of determining a driving speed includes (a) acquiring recognition data and state data by recognizing a pedestrian, (b) updating a pedestrian intention vector by estimating, via at least one of the recognition data and the state data, a probability distribution for a plurality of intentions that the pedestrian may have, (c) estimating a pedestrian intention at a next point in time on the basis of the updated pedestrian intention vector, and (d) determining a driving speed of a vehicle by considering the pedestrian intention at the next point in time.

According to another aspect of the disclosure, an apparatus for determining a driving speed includes a memory configured to store at least one program, and a processor operating by executing the at least one program, wherein the processor is configured to acquire recognition data and state data by recognizing a pedestrian, update a pedestrian intention vector by estimating, via at least one of the recognition data and the state data, a probability distribution for a plurality of intentions that the pedestrian may have, estimate a pedestrian intention at a next point in time on the basis of the updated pedestrian intention vector, and determine a driving speed of a vehicle by considering the pedestrian intention at the next point in time.

According to another aspect of the disclosure, a method of planning a driving speed includes acquiring a region of interest in front of a driving route of a vehicle, detecting a proximate object around the vehicle and setting a relevance of the proximate object with the vehicle on the basis of the region of interest, determining a reference location profile on the basis of the relevance, and determining a final location profile corresponding to the reference location profile.

According to another aspect of the disclosure, an apparatus for planning a driving speed includes a memory configured to store at least one program, and a processor operating by executing the at least one program, wherein the processor is configured to acquire a region of interest in front of a driving route of a vehicle, detect a proximate object around the vehicle, set a relevance of the proximate object with the vehicle on the basis of the region of interest, determine a reference location profile on the basis of the relevance, and determine a final location profile corresponding to the reference location profile.

According to another aspect of the disclosure, a method of optimizing a trajectory of a vehicle includes (a) acquiring a reference trajectory, (b) calculating a plurality of expected trajectories according to one or more control inputs, (c) calculating a cost function on the basis of at least one of the reference trajectory, the plurality of expected trajectories, and the one or more control inputs, and (d) selecting an optimal control input via which the cost function is minimized, from among the one or more control inputs.

According to another aspect of the disclosure, an apparatus for optimizing a trajectory of a vehicle includes a memory configured to store at least one program, and a processor operating by executing the at least one program, wherein the processor is configured to acquire a reference trajectory, calculate a plurality of expected trajectories according to one or more control inputs, calculate a cost function on the basis of at least one of the reference trajectory, the plurality of expected trajectories, and the one or more control inputs, and select an optimal control input via which the cost function is minimized, from among the one or more control inputs.

According to another aspect of the disclosure, a method of optimizing a trajectory of a vehicle includes (a) acquiring a reference trajectory, (b) determining a plurality of model prediction time points including a current time point by using a prediction reference horizon and a control period, (c) generating one or more control inputs at each of the plurality of model prediction time points, and calculating a plurality of expected trajectories according to the one or more control inputs, and (d) selecting an optimal control input corresponding to an optimal expected trajectory, from among the one or more control inputs.

According to another aspect of the disclosure, an apparatus for optimizing a trajectory of a vehicle includes a memory configured to store at least one program, and a processor operating by executing the at least one program, wherein the processor is configured to acquire a reference trajectory, determine a plurality of model prediction time points including a current time point by using a prediction reference horizon and a control period, generate one or more control inputs at each of the plurality of model prediction time points, calculate a plurality of expected trajectories according to the one or more control inputs, and select an optimal control input corresponding to an optimal expected trajectory, from among the one or more control inputs.

Provided is a computer-readable recording medium having recorded thereon a program for executing the method on a computer.

In addition, provided are another method and apparatus for implementing the disclosure, and a computer-readable recording medium having recorded thereon a program for executing the method.

Other aspects, features, and advantages other than those described above will become apparent from the following drawings, claims, and description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

4

Figure 11:
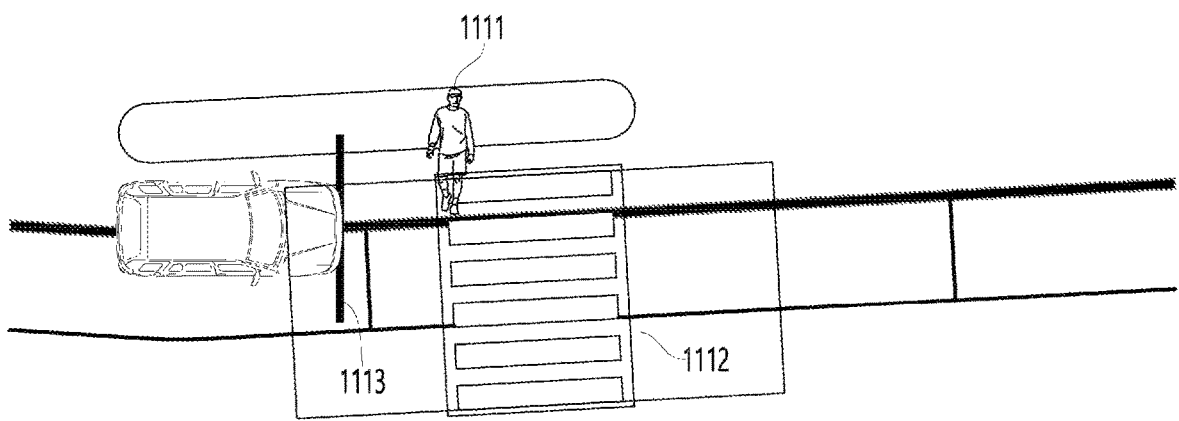
Figure 12:
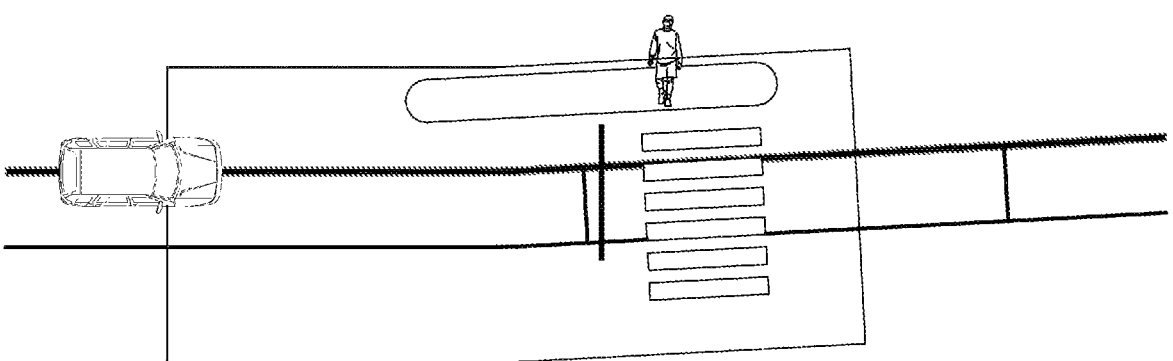
Figure 13:
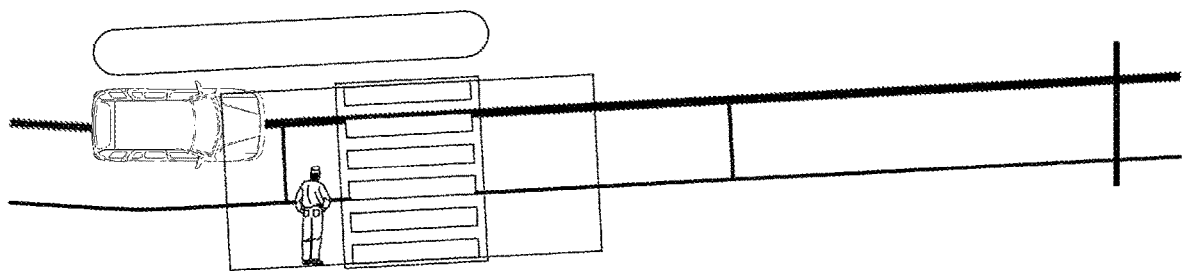

FIGS. 11 to 13 are example views of implementations of a method of setting a region of interest and determining whether or not to generate a virtual stop line, according to an embodiment.

Figure 14:
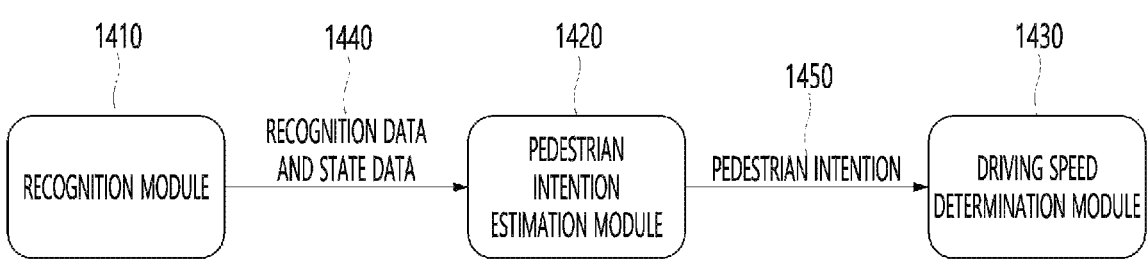
Figure 15:
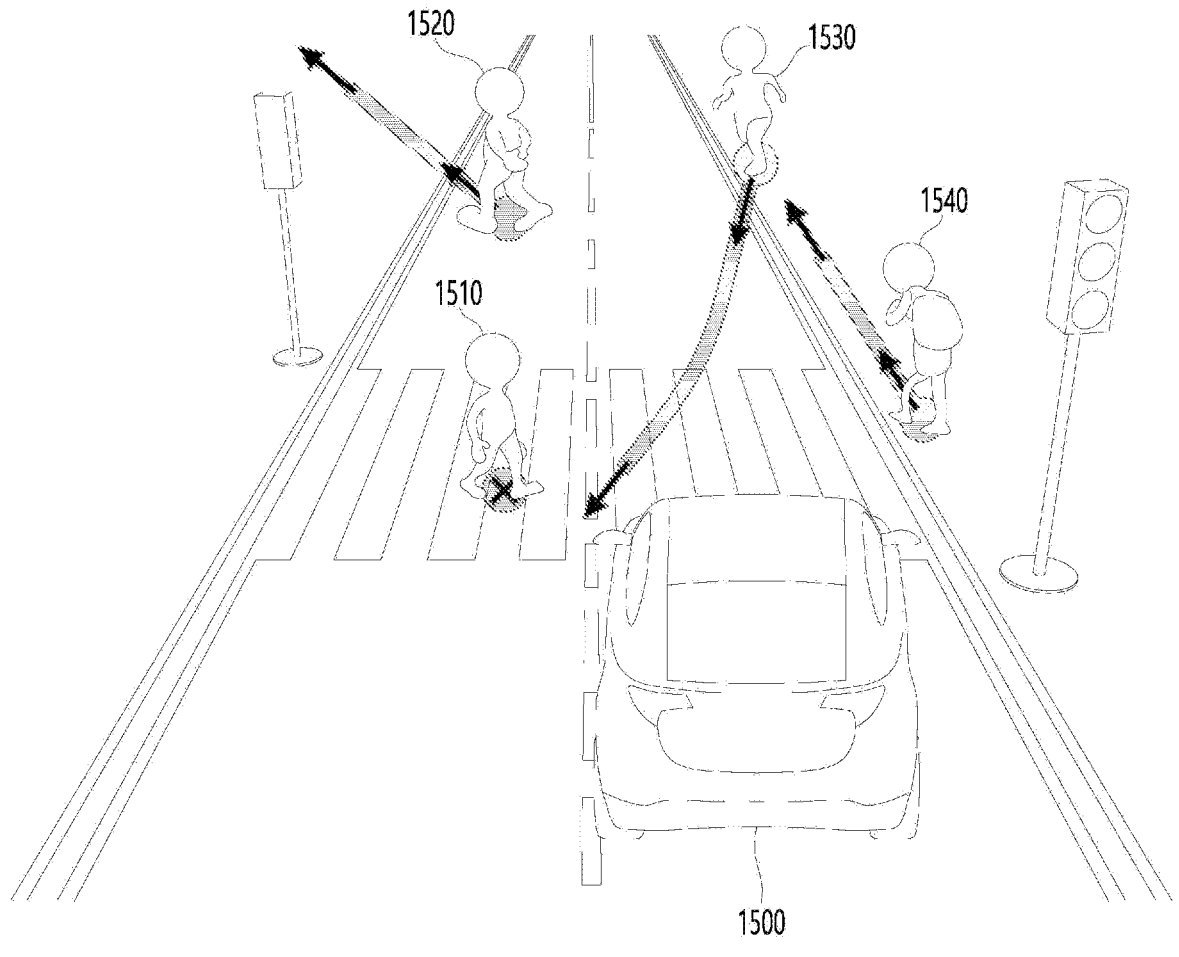
Figure 16:
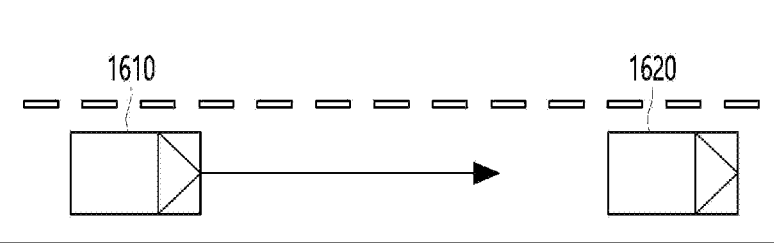
Figure 16:
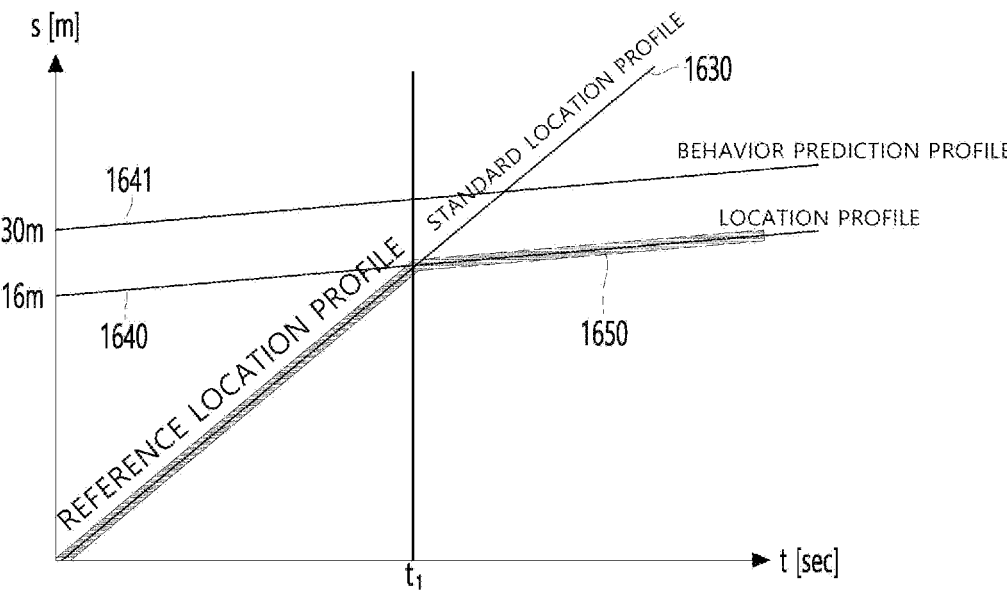
Figure 17:
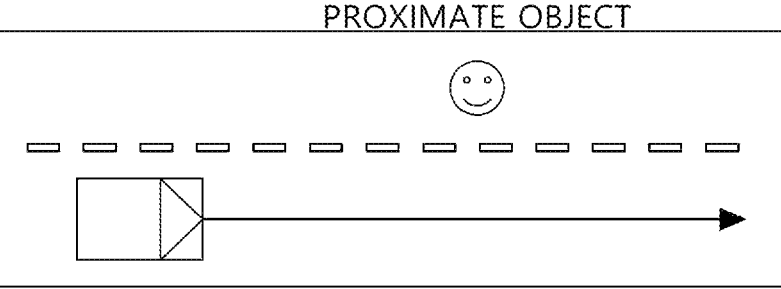
Figure 17:
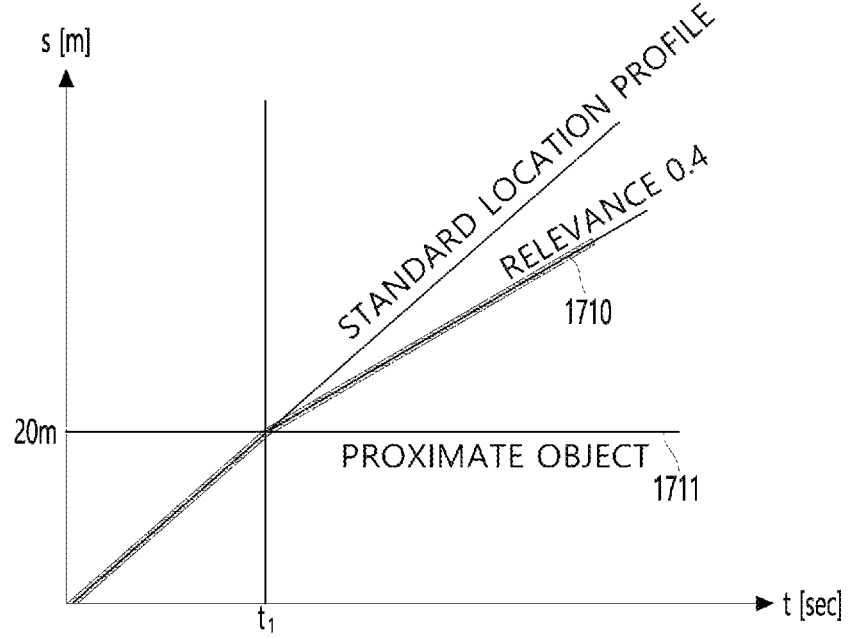
Figure 18:
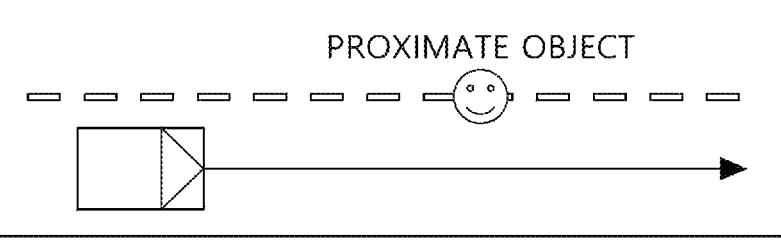
Figure 18:
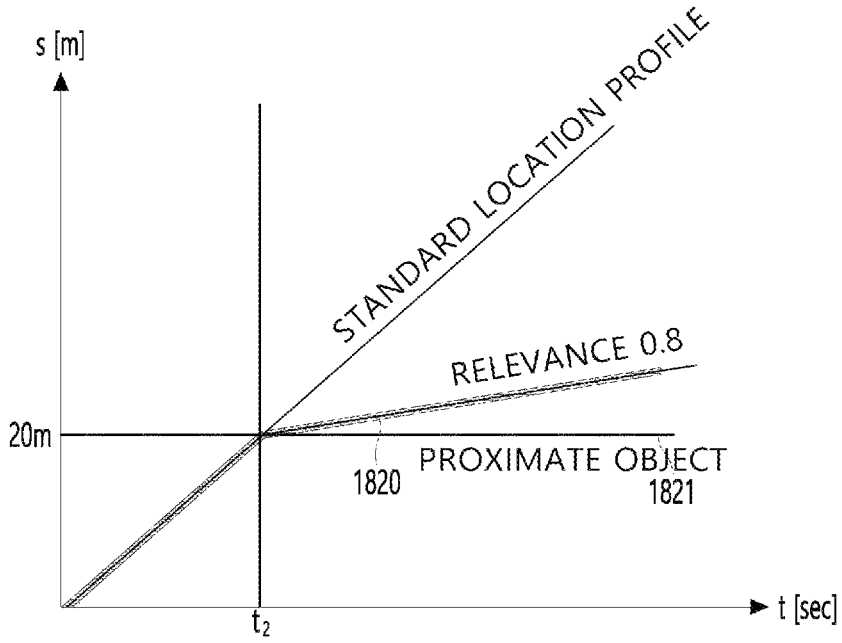
Figure 19:
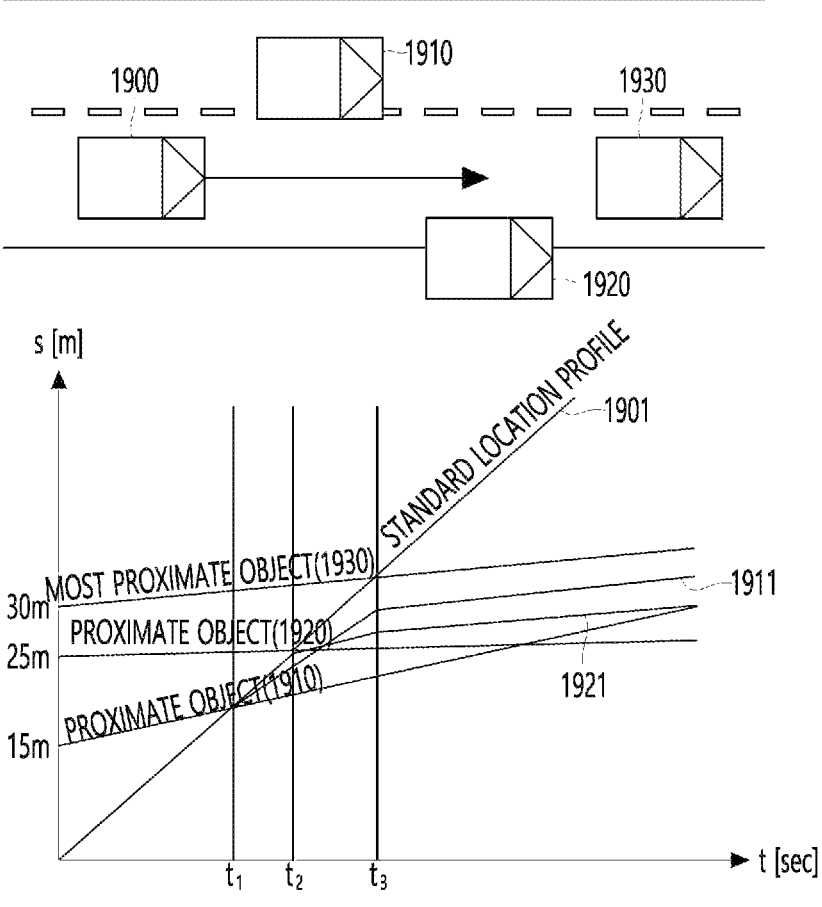
Figure 20:
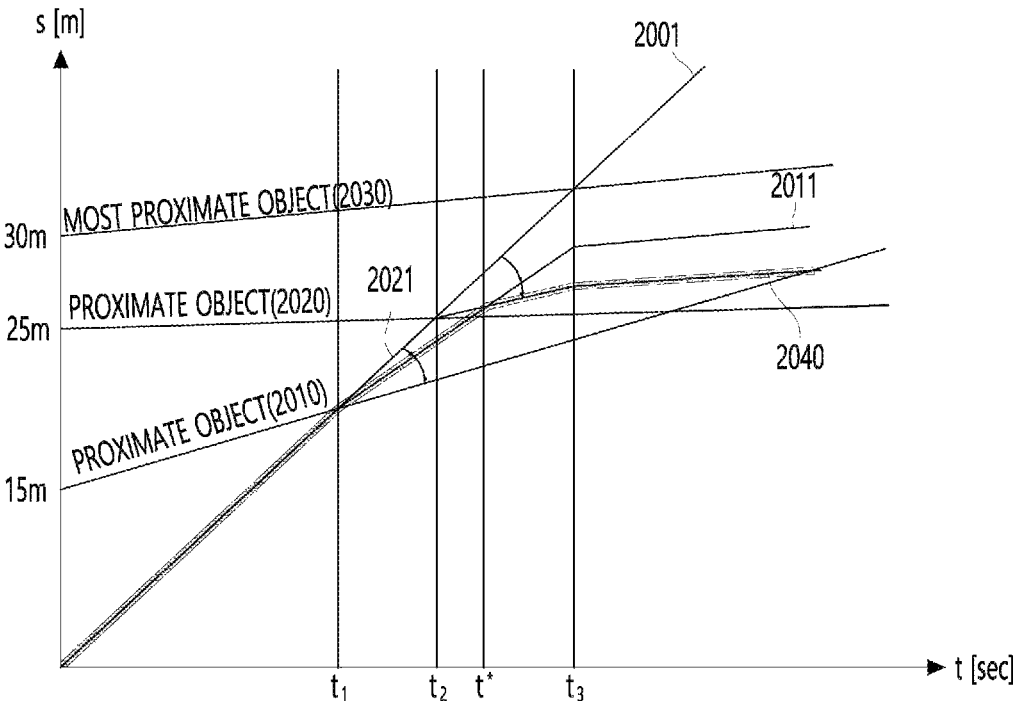
Figure 21:
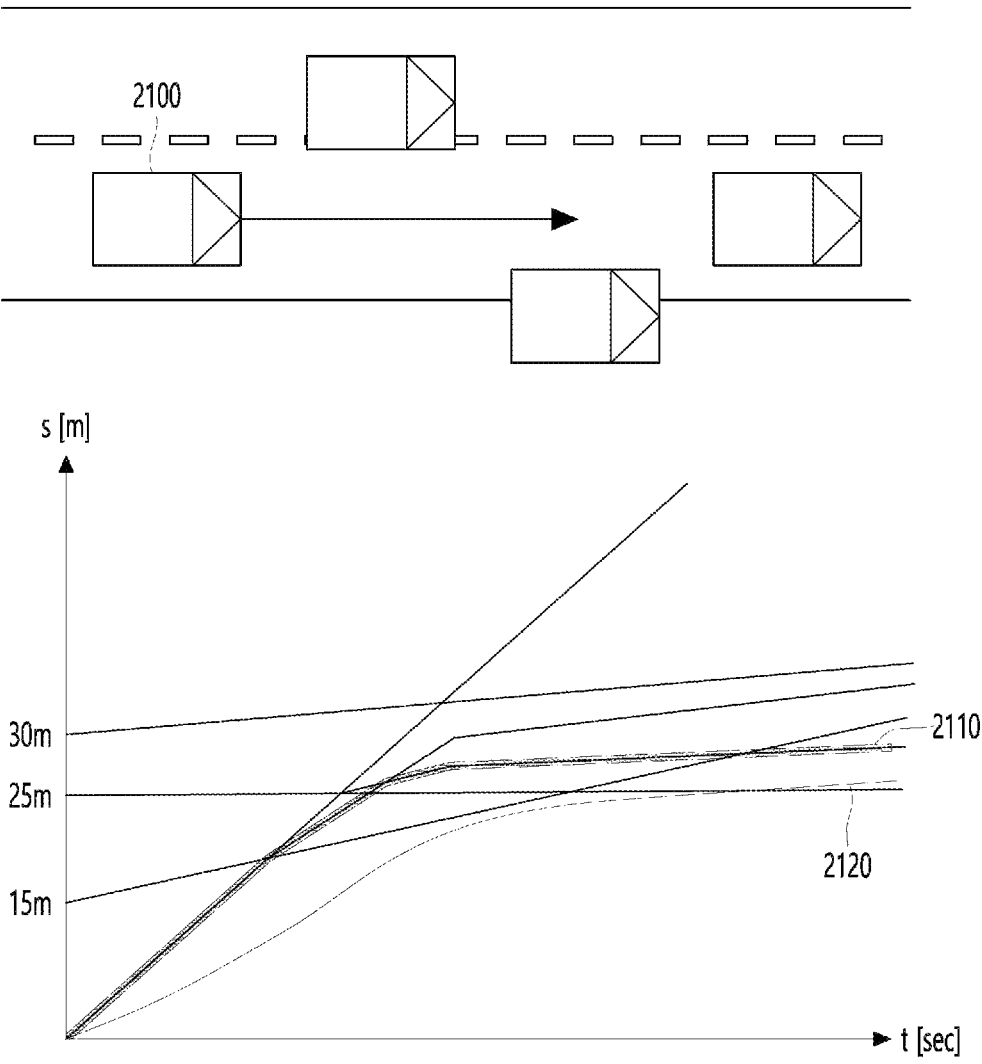
Figure 22:
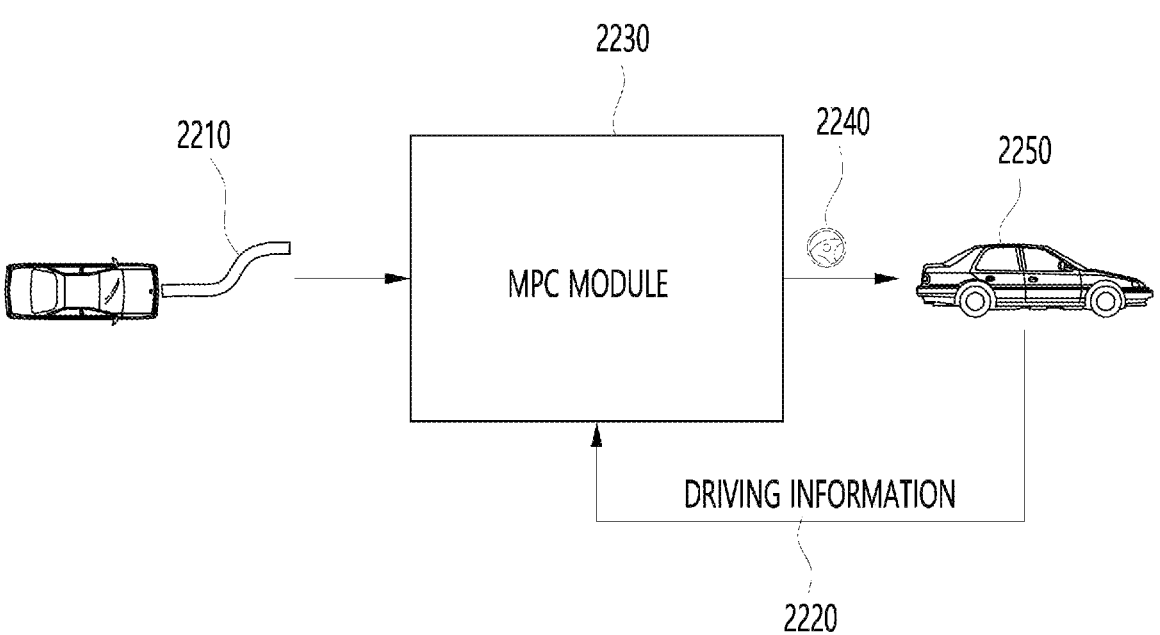
Figure 23:
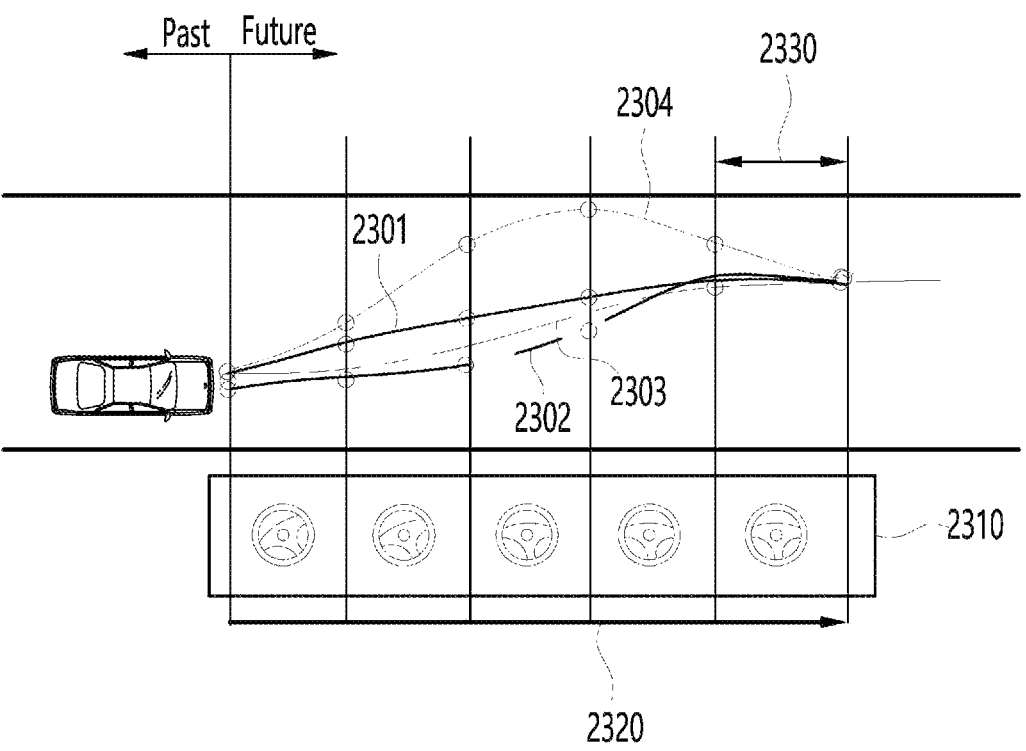
Figure 24:
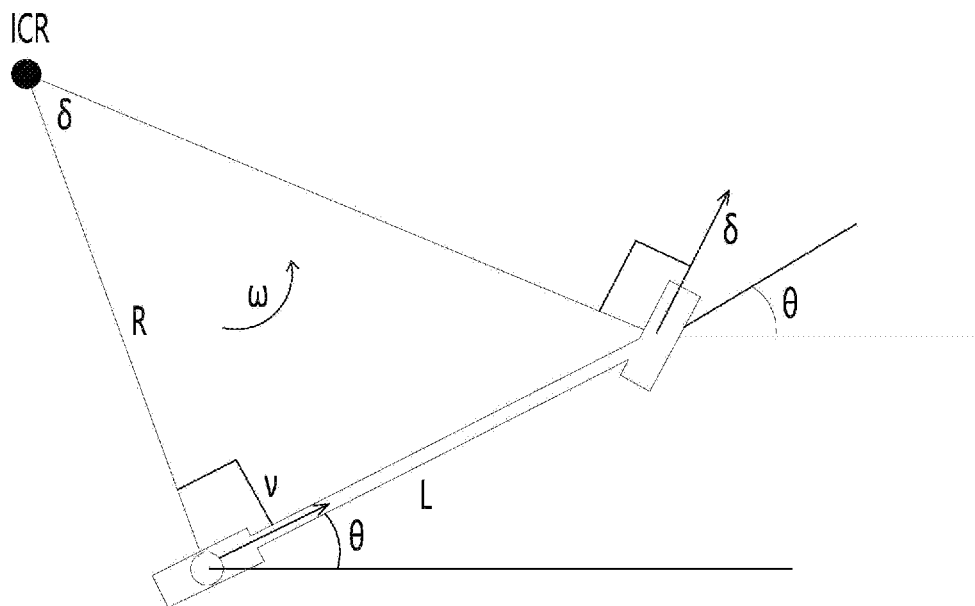
Figure 25:
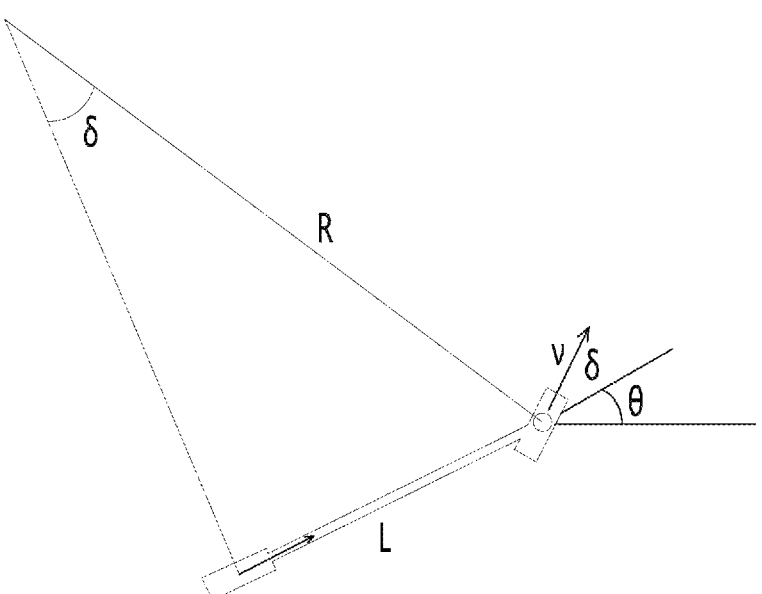
Figure 26:
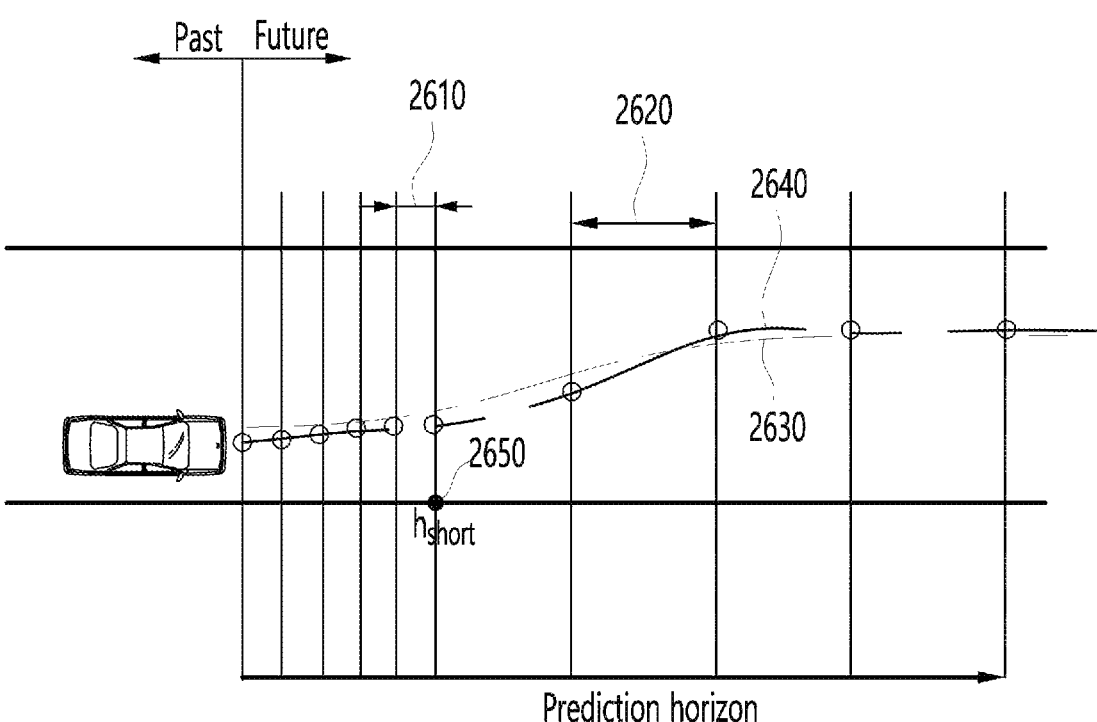
Figure 27:
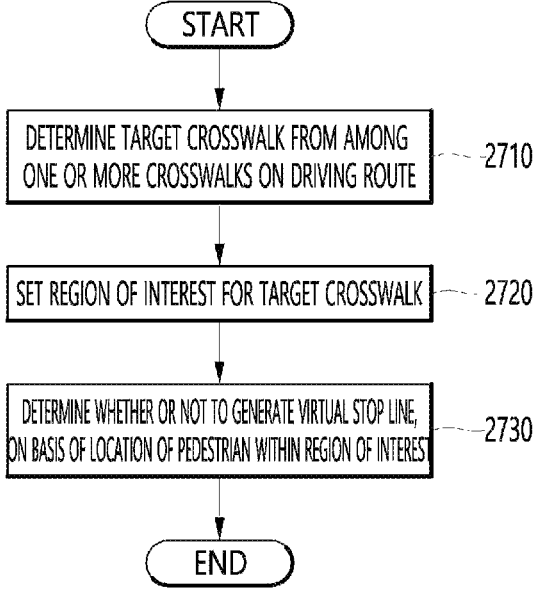
Figure 28:
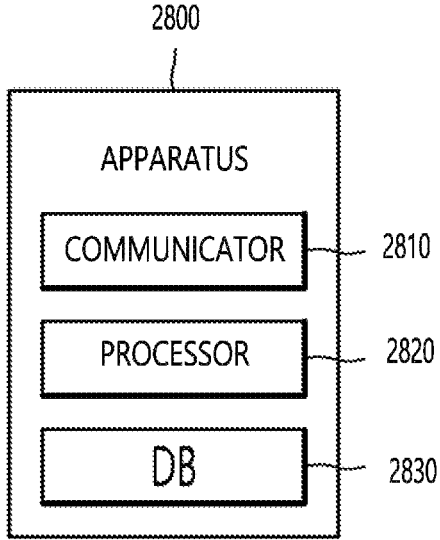

FIG. 14 is a conceptual diagram of a method of determining a driving speed by using an estimation of a pedestrian intention, according to an embodiment;

FIG. 15 is a view illustrating first to third intentions of a pedestrian according to an embodiment;

FIG. 16 is a view illustrating a method of planning a driving speed of a vehicle on the basis of behavior prediction information of a most proximate object, according to an embodiment;

FIGS. 17 and 18 are views illustrating a process of deriving a corrected location profile on the basis of a relevance of a proximity object, according to an embodiment;

FIGS. 19 and 20 are views illustrating a process of determining a reference location profile in an environment in which a plurality of proximate objects are present, according to an embodiment;

FIG. 21 is an example view illustrating a final location profile according to an embodiment;

FIG. 22 is an example view schematically illustrating a process of optimizing a trajectory of a vehicle, according to an embodiment;

FIG. 23 is a view illustrating a process in which a driving planning apparatus calculates an expected trajectory, according to an embodiment;

FIGS. 24 and 25 are views illustrating a prediction model for selecting an optimal control input by a driving planning apparatus, according to an embodiment;

FIG. 26 is a view illustrating a process in which a driving planning apparatus non-uniformly sets a control period, according to an embodiment;

FIG. 27 is a flowchart of a method of generating a virtual stop line, according to an embodiment; and FIG. 28 is a block diagram of an apparatus for generating a virtual stop line, according to an embodiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the disclosure, and methods of achieving the same will become clear with reference to the detailed description of embodiments taken in conjunction with the accompanying drawings. However, it should be understood that the disclosure is not limited to embodiments presented below, but may be implemented in various different forms, and includes all modifications, equivalents, and alternatives included in the spirit and scope of the disclosure. The embodiments presented below are provided to complete the disclosure and to fully inform those skilled in the art to which the disclosure belongs. When describing the disclosure, the detailed description of related known arts, which may obscure the subject matter of the disclosure, will be omitted.

Terms used herein are only used to describe particular embodiments, and are not intended to limit the disclosure. As used herein, the singular forms are intended to include the plural forms as well, unless the context clearly indicates otherwise. It will be further understood that the terms "comprises," "comprising," "have," and/or "having," when used herein, specify the presence of stated features, integers, steps, operations, elements, and/or components, but do not preclude the presence or addition of one or more other features, integers, steps, operations, elements, components, and/or groups thereof.

Some of the embodiments may be represented as functional block structures and various processing operations. Some or all of these functional blocks may be implemented as a varying number of hardware and/or software components that perform particular functions. For example, functional blocks of the disclosure may be implemented by one or more microprocessors, or may be implemented by circuit components for a certain function. Also, for example, the functional blocks of the disclosure may be implemented in various programming or scripting languages. The functional blocks may be implemented as an algorithm running on one or more processors. Also, the disclosure may employ related art for electronic environment configuration, signal processing, and/or data processing, and the like. The terms such as "mechanism," "element," "means," and "component" will be used broadly, and are not limited to mechanical and physical components.

In addition, connecting lines or connecting members between components shown in the drawings are only examples of functional connections and/or physical or circuit connections. In an actual apparatus, connections between components may be represented by various functional connections, physical connections, or circuit connections that may be replaced or added.

Hereinafter, a vehicle may refer to any type of transportation means such as a car, a bus, a motorcycle, a kickboard, or a truck, that is used with an engine to move people or objects.

Hereinafter, the disclosure will be described in detail with reference to the accompanying drawings.

Figure 1:
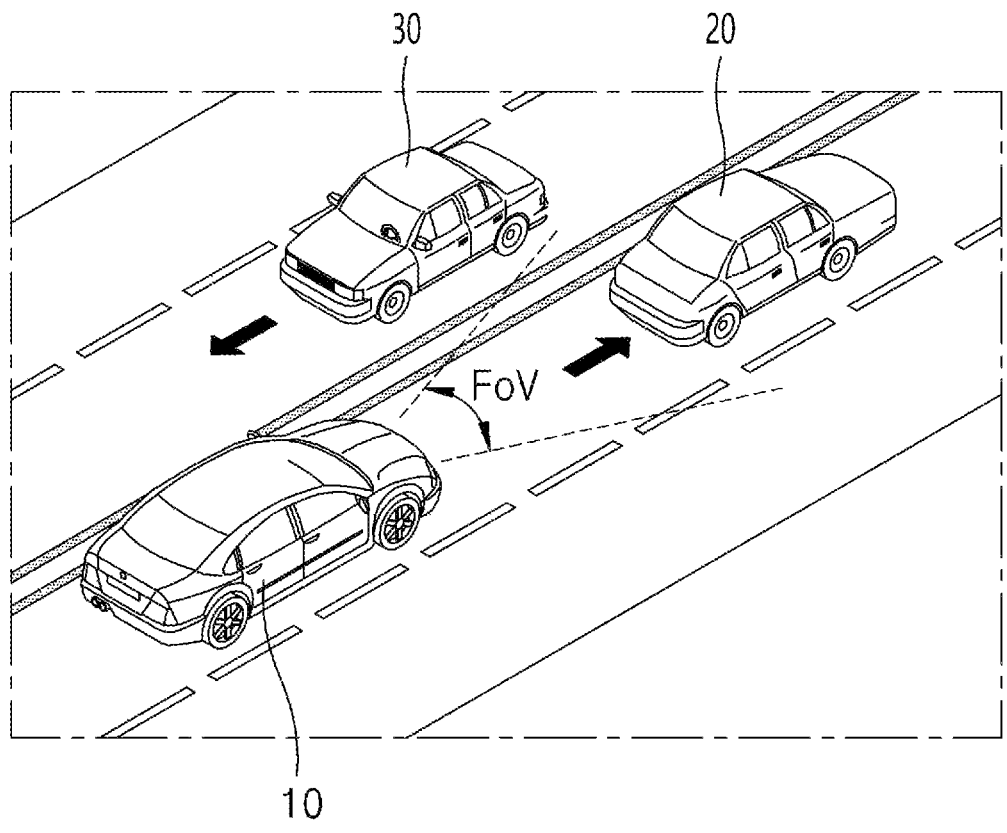
FIGS. 1 to 3 are diagrams illustrating an autonomous driving method according to an embodiment.

Referring to FIG. 1, an autonomous driving apparatus according to an embodiment may be mounted on a vehicle to implement an autonomous vehicle 10. The autonomous driving apparatus mounted on the autonomous vehicle 10 may include various types of sensors (including cameras) for collecting surrounding situation information. As an example, the autonomous driving apparatus may detect movement of a preceding vehicle 20 running in front via an image sensor and/or an event sensor mounted on the front of the autonomous vehicle 10. The autonomous driving apparatus may further include sensors for detecting the front side of the autonomous vehicle 10, another driving vehicle 30 operating in a side lane, a pedestrian around the autonomous vehicle 10, and the like.

As illustrated in FIG. 1, at least one of sensors for collecting situational information around the autonomous vehicle 10 may have a certain field of view (FoV). For example, when a sensor mounted on the front of the autonomous vehicle 10 has a field of view (FoV) as shown in FIG. 1, information detected from the center of the sensor may have a relatively high significance. In other words, the information detected from the center of the sensor may have the relatively high significance because most of information corresponding to movement of the preceding vehicle 20 is included in the information detected from the center of the sensor.

The autonomous driving apparatus may control the movement of the autonomous vehicle 10 by processing, in real time, information collected by sensors of the autonomous vehicle 10, and may store, in a memory device, at least some of the information collected by the sensors.

Figure 2:
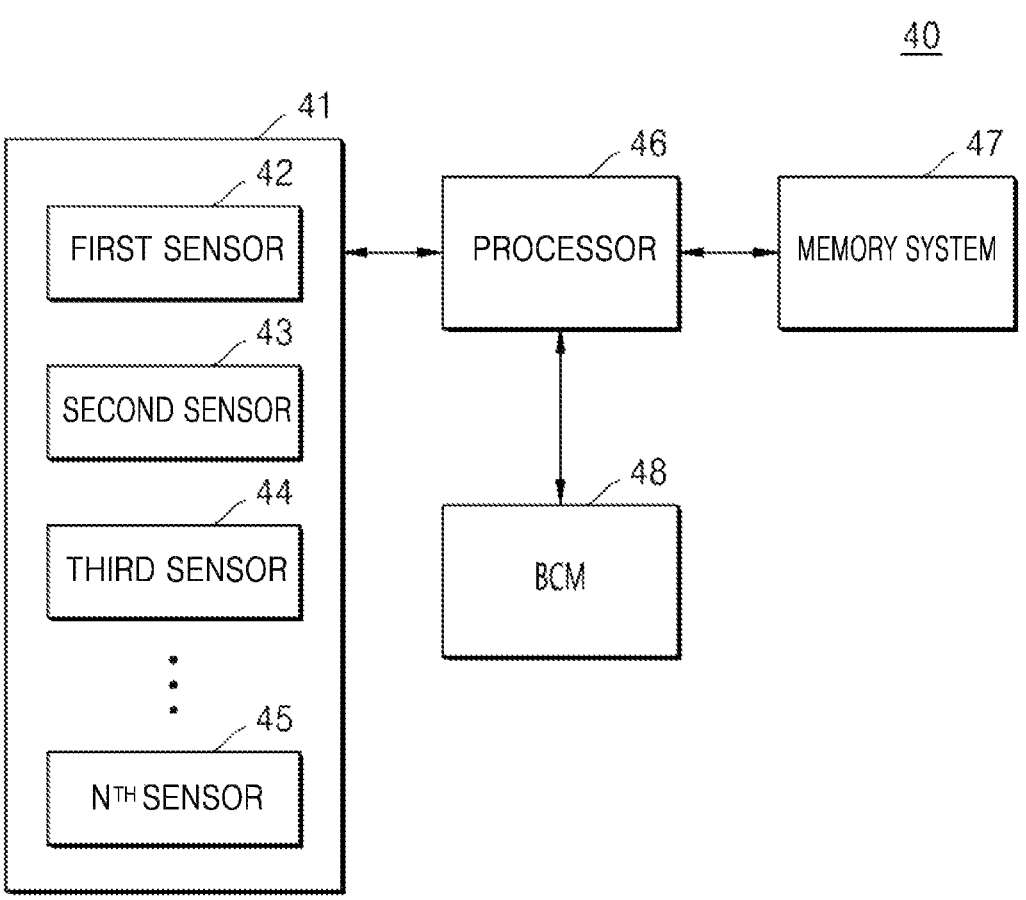

Referring to FIG. 2, an autonomous driving apparatus 40 may include a sensor unit 41, a processor 46, a memory system 47, a body control module (BCM) 48, and the like. The sensor unit 41 may include a plurality of sensors (including a camera) 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be transmitted to the processor 46. The processor 46 may store, in the memory system 47, the data collected by the sensors 42 to 45, and may determine movement of a vehicle by controlling the BCM 48 on the basis of the data collected by the sensors 42 to 45. The memory system 47 may include two or more memory devices, and a system controller for controlling the memory devices. Each of the memory devices may be provided as a single semiconductor chip.

In addition to the system controller of the memory system 47, each of the memory devices included in the memory system 47 may include a memory controller, and the memory controller may include an artificial intelligence (AI) operation circuit, such as a neural network. The memory controller may generate calculation data by assigning a certain weight to data received from the sensors 42 to 45 or the processor 46, and may store the calculation data in a memory chip.

Figure 3:
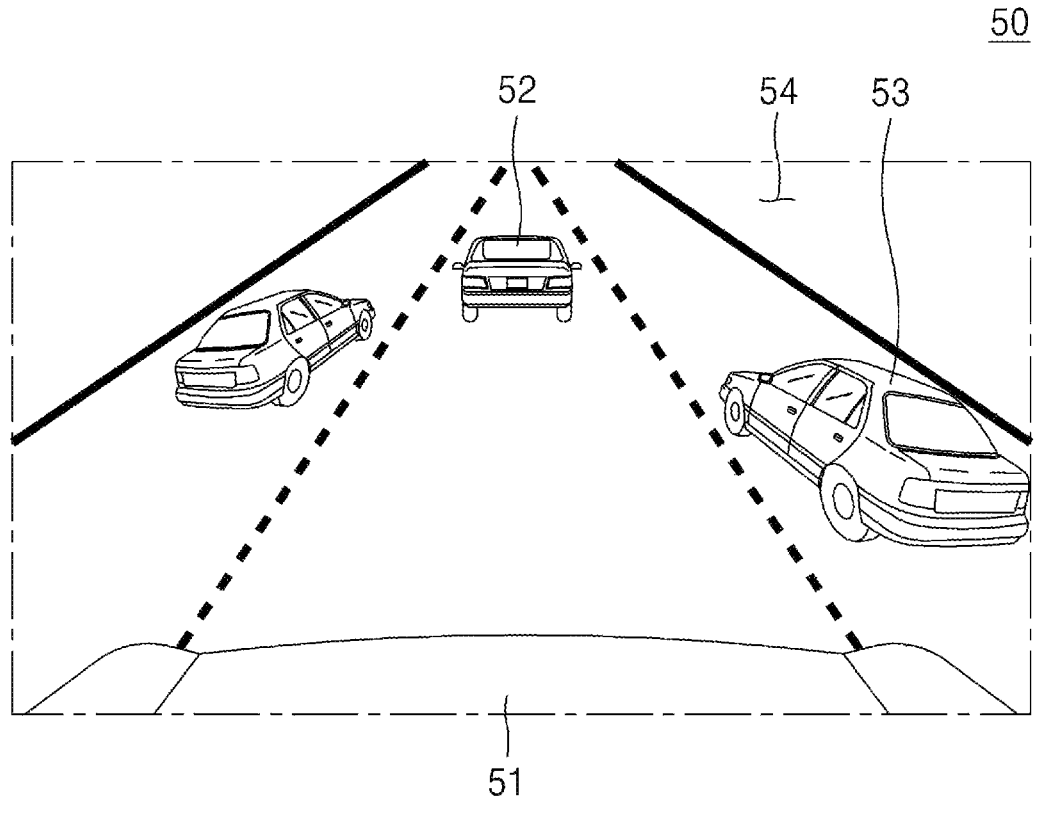

FIG. 3 is a view illustrating an example of image data acquired by a sensor (including a camera) of an autonomous vehicle having an autonomous driving apparatus mounted thereon. Referring to FIG. 3, image data 50 may be data acquired by a sensor mounted on the front of an autonomous vehicle. Therefore, the image data 50 may include a front portion 51 of the autonomous vehicle, a preceding vehicle 52 on the same lane as the autonomous vehicle, a driving vehicle 53 around the autonomous vehicle, a background 54, and the like.

From among the image data 50 according to the embodiment shown in FIG. 3, data of regions in which the front portion 51 of the autonomous vehicle and the background 54 appear may be data that is unlikely to affect operation of the autonomous vehicle. In other words, the front portion 51 of the autonomous vehicle and the background 54 may be regarded as data having a relatively low significance.

However, a distance to the preceding vehicle 52, movement of the driving vehicle 53 to change a lane, and the like may be highly significant factors for safe operation of the autonomous vehicle. Accordingly, from among the image data 50, data of a region including the preceding vehicle 52, the driving vehicle 53, and the like may have a relatively high significance for the operation of the autonomous vehicle.

A memory device of the autonomous driving apparatus may store the image data received from the sensor by assigning different weights to respective regions of the image data 50. For example, a high weight may be assigned to the data of the region including the preceding vehicle 52, the driving vehicle 53, and the like, and a low weight may be assigned to the data of the regions in which the front portion 51 of the autonomous vehicle and the background 54 appear.

Hereinafter, operations according to various embodiments may be understood as being performed by the autonomous driving apparatus or a processor included in the autonomous driving apparatus.

A lane on which the autonomous vehicle travels may include various markings. For example, a lane may include markings for lane markings, crosswalks, stop lines, and the like. From among various markings, a crosswalk is a path provided on a road so that a pedestrian may cross the road.

An autonomous vehicle is basically controlled to stop at a stop line when a road signal in a travel direction of the vehicle is red, and to travel when the road signal is green, and thus is controlled to decelerate or stop regardless of the road signal when a pedestrian is recognized near a crosswalk while traveling. In the control method described above, when a certain region near the crosswalk is not appropriately set, rapid deceleration occurs in a situation in which deceleration is not needed, and thus, a dangerous situation occurs behind the autonomous vehicle, or in a situation in which deceleration is needed, insufficient deceleration may result in dangerous situations in the front of and on the side of the autonomous vehicle. In addition, when cognitive information of the pedestrian is inaccurate, deceleration and acceleration may occur inconsistently, and thus, ride comfort may worsen. In this respect, the disclosure may provide a method of generating a virtual stop line by considering both the safety and ride comfort of a vehicle and a pedestrian in a situation in which an autonomous vehicle passes through a crosswalk, and a method of controlling a vehicle via the same.

Hereinafter, a virtual stop line generating apparatus (hereinafter, referred to as a driving planning apparatus) according to an embodiment may refer to an autonomous vehicle, and may be an apparatus embedded inside a vehicle or provided separately from the vehicle as described below.

Figure 4:
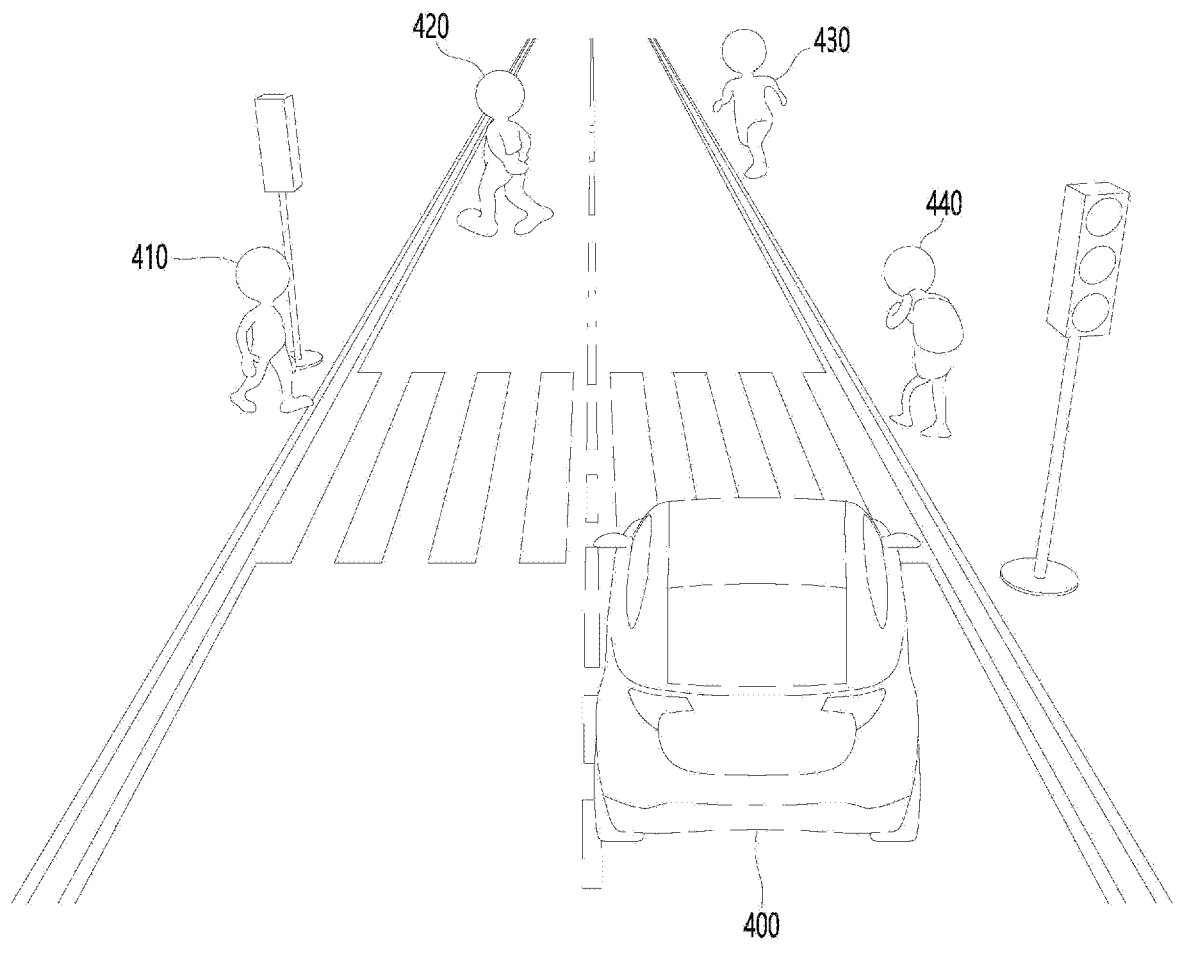
FIGS. 4 and 5 are example views schematically illustrating an environment around a vehicle driving route, according to an embodiment.
Figure 5:
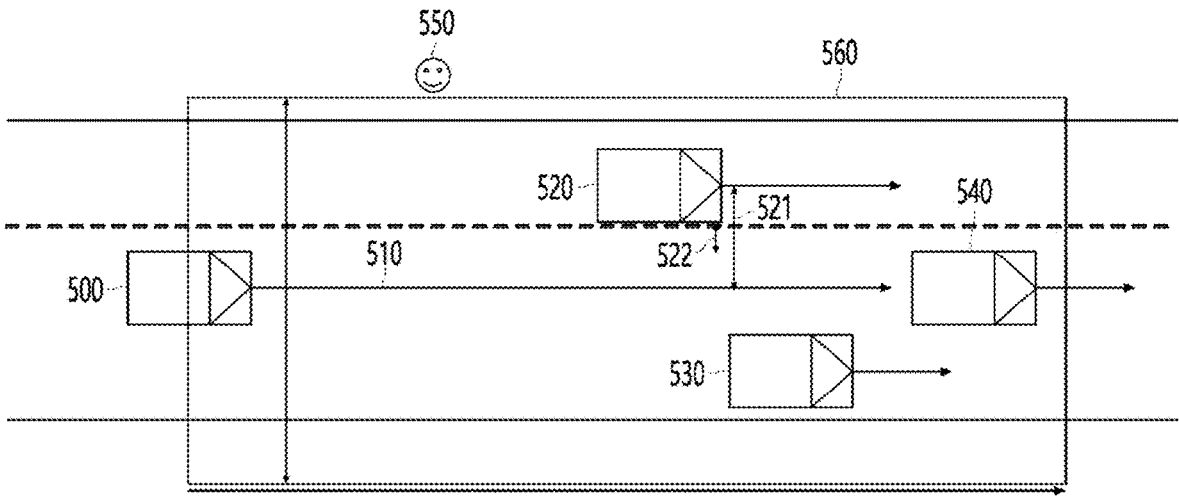

FIGS. 4 and 5 are example views schematically illustrating an environment around a vehicle driving route, according to an embodiment.

Referring to FIG. 4, a crosswalk and one or more pedestrians 410, 420, 430, and 440 may be present around a driving route of a vehicle 400. Behaviors of the pedestrians 410, 420, 430, and 440 need to be considered for the vehicle 400 to travel safely.

Referring to FIG. 5, various objects including vehicles 520, 530, and 540 as well as a crosswalk and a pedestrian 550 may be present in front of a driving route 510 of a vehicle 500. Not only a behavior of the pedestrian 550 but also driving states of the other vehicles 520, 530, and 540 need to be considered for the vehicle 500 to travel safely.

Therefore, a driving planning apparatus according to the disclosure may set, as a region of interest 560, a range to be considered when the vehicle 500 travels and determine a driving speed of the vehicle 500 on the basis of the region of interest 560. However, the driving planning apparatus may determine the driving speed by considering even the object 550 that is not included in the region of interest 560, and a range considered by the driving planning apparatus to determine the driving speed or control the vehicle 500 is not limited thereto.

In an embodiment, the driving planning apparatus may acquire the region of interest 560 that is a certain region in front of the driving route 510. The driving planning apparatus may determine the driving speed of the vehicle 500 by considering only the objects 520, 530, and 540 included in the region of interest 560. FIG. 5 illustrates that only the vehicle 520, 530 and 540 is included in the region of interest 560, but a pedestrian may also be included in the region of interest 560. In other words, the objects 520, 530, and 540 included in the region of interest 560 may include pedestrians as well as vehicles. A method of setting the region of interest 560 is described below with reference to FIG. 7.

Figure 6:
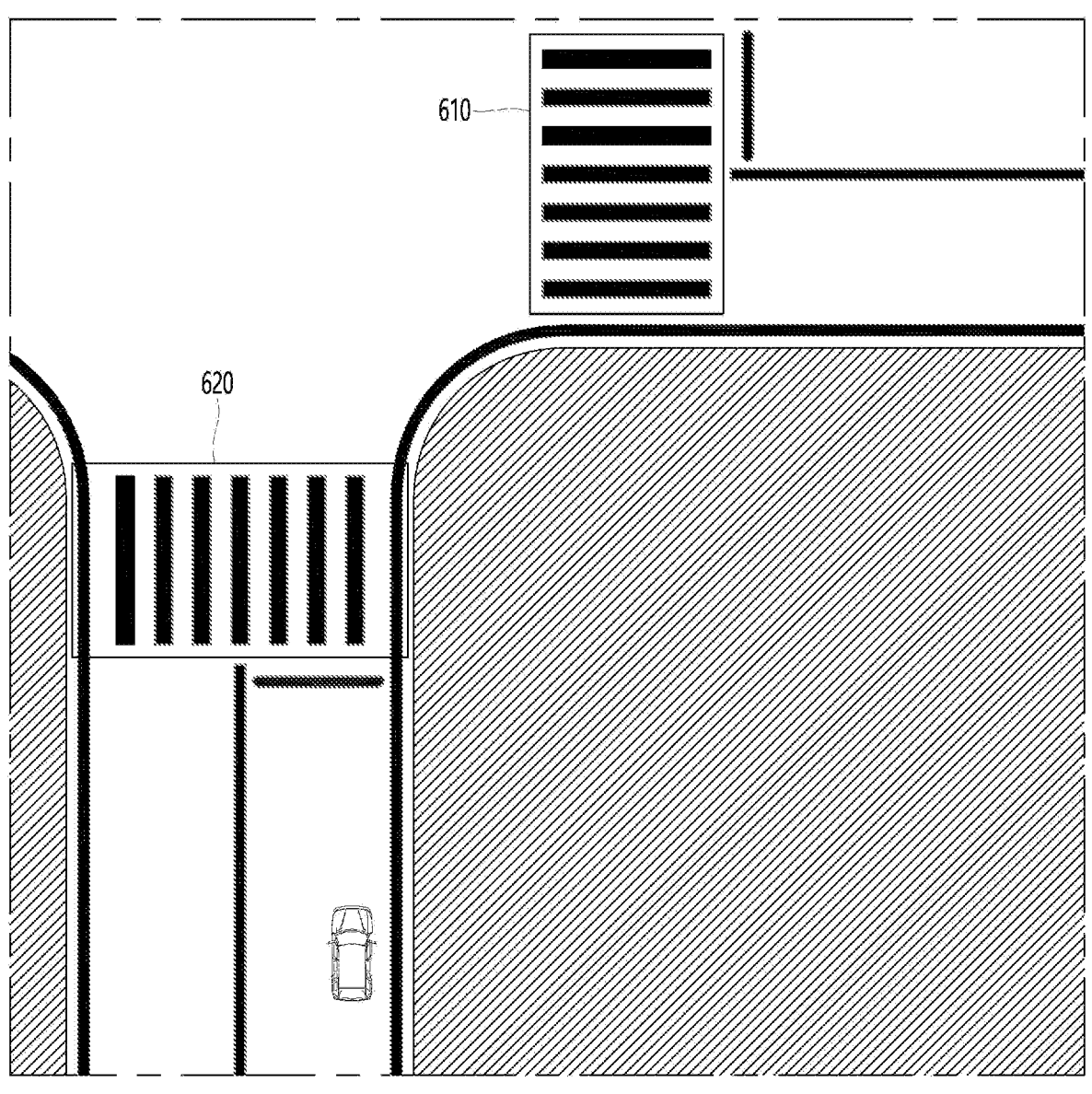
FIG. 6 is a view illustrating a process of determining a target crosswalk, according to an embodiment.

FIG. 6 is a view illustrating a process of determining a target crosswalk, according to an embodiment.

Referring to FIG. 6, a driving planning apparatus may recognize one or more crosswalks 610 and 620 on a driving route. For example, the driving planning apparatus may recognize the one or more crosswalks 610 and 620 on the basis of an image and/or vision sensor. Alternatively, the driving planning apparatus may receive traffic information and recognize the one or more crosswalks 610 and 620 on the basis of the traffic information and a location of a vehicle.

The driving planning apparatus may determine a target crosswalk from among the one or more crosswalks 610 and 620.

The target crosswalk may refer to a crosswalk that the driving planning apparatus need to consider as a top priority to generate a virtual stop line. For example, the target crosswalk may refer to a most proximate crosswalk on a driving route in front of the vehicle.

In an embodiment, the driving planning apparatus may determine the target crosswalk by determining, on the basis of a current location of the vehicle, a crosswalk through which the vehicle is passing. Therefore, the driving planning apparatus may determine, as the target crosswalk, the crosswalk 620 through which the vehicle passes first or which is the most proximate in front of the driving route of the vehicle.

Figure 7:
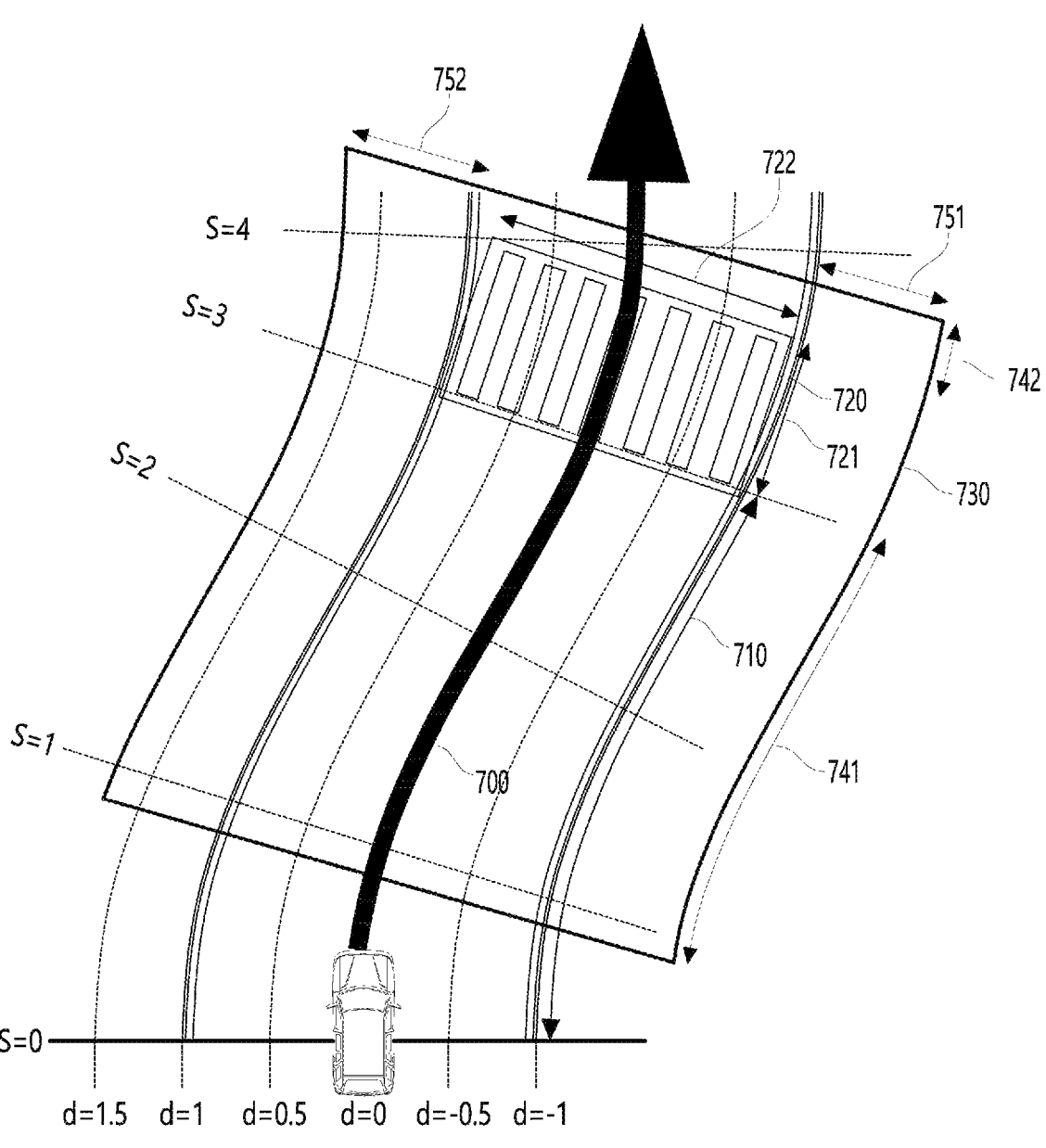
FIG. 7 is a view illustrating a process of setting a region of interest, according to an embodiment.

FIG. 7 is a view illustrating a process of setting a region of interest, according to an embodiment.

Referring to FIG. 7, an environment in which a vehicle travels may include a driving route 700, a target crosswalk 720, and the like. For example, the driving route 700 may be a route connecting intermediate points of a width of a lane on which the vehicle is currently traveling. Alternatively, the driving route 700 may be a route connecting intermediate points of a start node and an end node of driving route nodes acquired when generating traffic information.

In an embodiment, a driving planning apparatus may acquire a distance 710 to the target crosswalk 720. For example, the distance 710 to the target crosswalk 720 may correspond to a distance on the driving route 700 from a current location of a vehicle to the target crosswalk 720 or a stop line (not shown) corresponding to the target crosswalk 720. When the driving route 700 is a curve, a distance on the driving route 700 and an absolute distance (a linear distance) may be different from each other. In another example, the distance 710 to the target crosswalk 720 may refer to the absolute distance (the linear distance).

In another example, the distance 710 to the target crosswalk 720 may correspond to a distance to the target crosswalk 720 from a location at which a camera or sensor is mounted within the vehicle. Alternatively, the distance 710 to the target crosswalk 720 may correspond to a distance from a foremost end of the vehicle or a rearmost end of the vehicle to the target crosswalk 720.

In an embodiment, the driving planning apparatus may acquire a width 721 of the target crosswalk 720 and a crossing length 722 of the target crosswalk 720. The width 721 may correspond to an area of the target crosswalk 720, and the crossing length 722 may correspond to a length that a pedestrian crosses a road through the target crosswalk 720.

Figure 8:
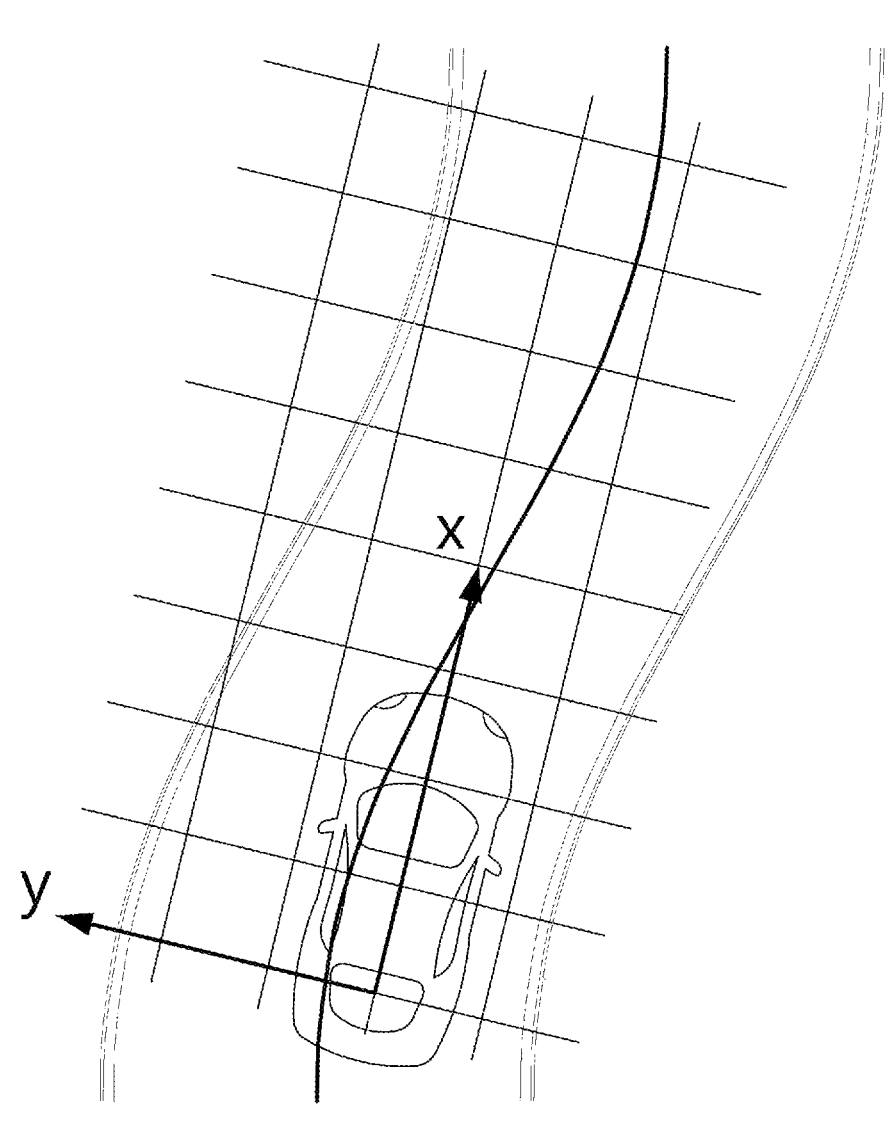
FIGS. 8 and 9 are views illustrating a Cartesian frame and a Frenet frame.
Figure 9:
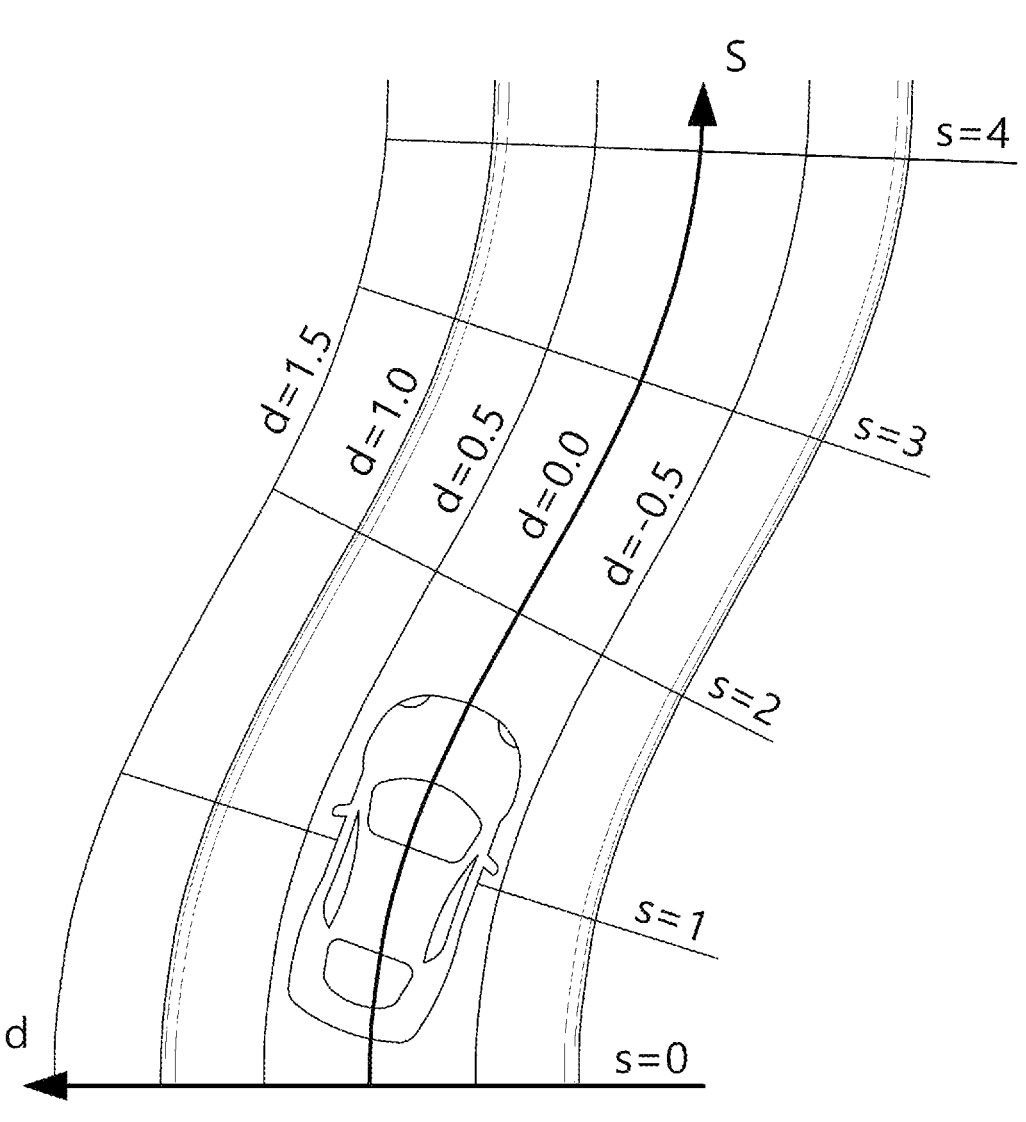

FIGS. 8 and 9 are views illustrating a Cartesian frame and a Frenet frame.

Referring to FIG. 8, a Cartesian frame refers to a coordinate system representing a coordinate plane or a coordinate space by using axes orthogonal to each other. When a driving environment of a road is configured by a Cartesian frame, an x-axis and a y-axis may be formed regardless of a shape of the road.

Referring to FIG. 9, a Frenet frame may refer to a coordinate system defined by a unit tangent vector, a unit normal vector, and a binormal vector, and may describe movement of a curve having a curvature. When a driving environment of a road is configured by a Frenet frame, an s-axis may be formed in a direction of a shape of the road and a d-axis may be formed in a direction perpendicular to the road. In other words, an s coordinate may represent a driving length, and a d coordinate may represent a distance from a driving route in a lateral direction. As illustrated in FIG. 9, a start point of the driving route is set to s=0 and d=0, but may vary according to frame setting.

In the Frenet frame, the driving length may be described by s-axis coordinates, and thus, the driving route may be mathematically expressed more simply. Therefore, the Frenete frame may be intuitive and convenient. In addition, the Frenet frame may be useful when assigning a Cartesian coordinate system to a trajectory is complicated or inconvenient.

Referring back to FIG. 7, the driving planning apparatus may acquire the width 721 and the crossing length 722 of the target crosswalk 720 through a parameter based on a Frenet frame. For example, the driving planning apparatus may acquire the target crosswalk 720 expressed on the basis of a Frenet frame, and may acquire the width 721 and the crossing length 722 by using the parameter.

The driving planning apparatus may set a region of interest 730 for the target crosswalk 720. The region of interest 730 may be a certain region near the target crosswalk 720, and may refer to a region to be considered when the vehicle generates a virtual stop line. For example, the driving planning apparatus may generate the virtual stop line by considering only a pedestrian within the region of interest 730, and may not consider a pedestrian outside the region of interest 730.

In an embodiment, the driving planning apparatus may set margins 741, 742, 751, and 752 of the region of interest 730 by using the target crosswalk 720, and may set the region of interest 730 by using the margins 741, 742, 751, and 752.

The margins 741, 742, 751, and 752 of the region of interest 730 may be factors for determining a size and location of the region of interest 730, and when the margins 741, 742, 751, and 752 are set to be great, the region of interest 730 may increase, and thus, safety may increase. When the margins 741, 742, 751, and 752 are set to be small, the region of interest 730 may decrease, and thus, an amount of calculation of the driving planning apparatus may be reduced and efficient driving may be enabled. In the disclosure, the driving planning apparatus provides a method of promoting safety, ride comfort, and efficiency by setting the region of interest 730 on the basis of the distance 710 to the target crosswalk 720.

In an embodiment, the driving planning apparatus may set the margins 741, 742, 751, and 752 to be great when the distance 710 to the target crosswalk 720 increases, and may set the margins 741, 742, 751, and 752 to be small when the distance 710 to the target crosswalk 720 decreases.

The driving planning apparatus may relatively inaccurately recognize a pedestrian and a location of the pedestrian when a current location of the vehicle is far from the target crosswalk 720 and relatively accurately recognize the pedestrian and the location of the pedestrian when the current location of the vehicle is close to the target crosswalk 720. Therefore, by differently setting the margins 741, 742, 751, and 752 of the region of interest 730 according to the distance 710 to the target crosswalk 720, a virtual stop line may be generated in advance from a long distance to prevent deterioration in ride comfort due to rapid deceleration and to promote safety considering an error in the location of the pedestrian, and safety and driving efficiency may be promoted by preventing a deadlock that may occur when the pedestrian stands on a road boundary by reducing the margins 741, 742, 751, and 752 of the region of interest 730 at a short distance.

In an embodiment, the driving planning apparatus may set the margins 741, 742, 751, and 752 of the region of interest 730 to be great when a speed of the vehicle increases and set the margins 741, 742, 751, and 752 of the region of interest 730 to be small when the speed of the vehicle decreases. The driving planning apparatus may relatively inaccurately recognize the pedestrian within the region of interest 730 when the speed of the vehicle increases, and the vehicle may not easily decelerate or stop without rapid deceleration when the region of interest 730 is not great. Therefore, when the speed of the vehicle increases, the driving planning apparatus may set the margins 741, 742, 751, and 752 of the region of interest 730 to be great to increase safety and ride comfort.

In an embodiment, the margins 741, 742, 751, and 752 of the region of interest 730 may include longitudinal margins 741 and 742 and lateral margins 751 and 752. In the present embodiment, a longitudinal direction may refer to a direction parallel to the driving route 700, and a lateral direction may refer to a direction perpendicular to the driving route 700. Therefore, the longitudinal margins 741 and 742 refer to margins from both longitudinal ends of the target crosswalk 720 to both longitudinal ends of the region of interest 730, and the lateral margins 751 and 752 refer to margins from both lateral ends of the target crosswalk 720 to both lateral ends of the region of interest 730.

In an embodiment, the driving planning apparatus may set the longitudinal margins 741 and 742 on the basis of the width 721 of the target crosswalk 720 and the distance 710 to the target crosswalk 720. For example, the driving planning apparatus may set the longitudinal margins 741 and 742 in proportion to the distance 710 to the target crosswalk 720. Alternatively, the driving planning apparatus may set the longitudinal margins 741 and 742 in proportion to the width 721 of the target crosswalk 720.

Here, the driving planning apparatus may differently set the entry longitudinal margin 741 to the target crosswalk 720 and the exit longitudinal margin 742 from the target crosswalk 720.

Similarly, in an embodiment, the driving planning apparatus may set the lateral margins 751 and 752 on the basis of the crossing length 722 of the target crosswalk 720 and the distance 710 to the target crosswalk 720. For example, the driving planning apparatus may set the lateral margins 751 and 752 in proportion to the distance 710 to the target crosswalk 720. Alternatively, the driving planning apparatus may set the lateral margins 751 and 752 in proportion to the width 721 of the target crosswalk 720.

Here, the driving planning apparatus may differently set the entry lateral margin 751 to the target crosswalk 720 and the exit lateral margin 752 from the target crosswalk 720.

In an embodiment, the driving planning apparatus may set the region of interest 730 in any form. For example, the driving planning apparatus may set the region of interest 730 in any form determined by using at least one of a topography of a road and the driving route 700. Alternatively, the driving planning apparatus may set the region of interest 730 in a predetermined particular form.

Meanwhile, the driving planning apparatus may set the region of interest 730 and the margins 741, 742, 751, and 752 of the region of interest 730 on the basis of a Frenet frame. In detail, the region of interest 730 may have lateral and longitudinal margins on the basis of a traveling route of a vehicle, and thus, the region of interest 730 may be acquired through a Frenet frame-based parameter, and the margins 741, 742, 751, and 752 of the region of interest 730 may also be set on the basis of a Frenet frame.

Figure 10:
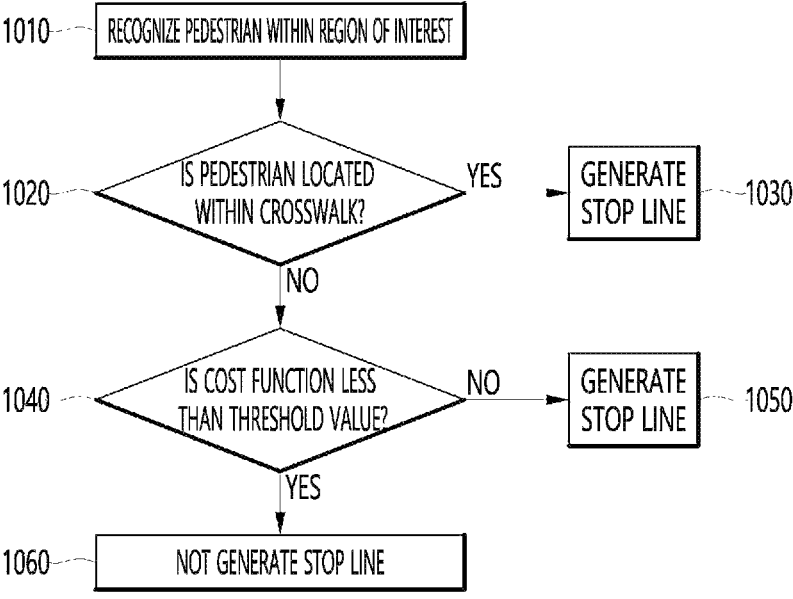
FIG. 10 is a flowchart of a method of determining whether or not to generate a virtual stop line, according to an embodiment.

FIG. 10 is a flowchart of a method of determining whether or not to generate a virtual stop line, according to an embodiment.

In an embodiment, a driving planning apparatus may detect a proximate object present around a vehicle. The proximate object may be an object within a region of interest or an object outside the region of interest. For example, the driving planning apparatus may include or be separately provided with various types of photographing devices or sensors such as a camera, an image sensor, and a RADAR or LIDAR sensor, which may be used alone or in combination to detect a proximate object around a vehicle and collect information regarding the surroundings of the vehicle. Accordingly, the detected object may correspond to a plurality of measurement points acquired from an image sensor or the like as well as a captured image shape. In addition, the information regarding the surroundings of the vehicle may include recognition data and state data. The proximate object may include not only a pedestrian but also other vehicles.

In an embodiment, the driving planning apparatus may determine whether or not to generate a virtual stop line, on the basis of a location of a pedestrian within the region of interest. When the driving planning apparatus controls the vehicle to decelerate or stop on the basis of only whether or not the pedestrian is within the region of interest, efficiency may be reduced, and when many vehicles are located on a road, safety may be reduced. In the disclosure described below, the driving planning apparatus may increase control safety by determining whether or not to generate a stop line by calculating a cost function for the pedestrian within the region of interest, or by determining, on the basis of a distance to a target crosswalk, whether or not to generate a stop line.

Referring to FIG. 10, in operation 1010, a driving planning apparatus may recognize a pedestrian within a region of interest.

In operation 1020, the driving planning apparatus may determine whether the pedestrian is located in a first region or a second region. For example, the driving planning apparatus may determine whether or not the pedestrian is within a crosswalk.

In an embodiment, in operation 1030, the driving planning apparatus may determine to generate a virtual stop line, in response to determining that the pedestrian is located in the first region. The first region may refer to a region inside a target crosswalk. Here, the driving planning apparatus may control the vehicle to decelerate by generating a virtual stop line.

In an embodiment, in response to determining that the pedestrian is located in the second region, the driving planning apparatus may determine again whether or not to generate a virtual stop line, on the basis of a distance to the target crosswalk. The second region may refer to a region corresponding to an intersection between a region outside the target crosswalk and a region inside the region of interest. When determining whether or not to generate the virtual stop line, the driving planning apparatus may determine to generate the virtual stop line when the distance to the target crosswalk is greater than or equal to a certain distance and determine not to generate the virtual stop line when the distance to the target crosswalk is less than the certain distance. In other words, even when the pedestrian is within the region of interest, the driving planning apparatus may determine not to generate the virtual stop line when the pedestrian is located at a short distance from the vehicle.

In operation 1040, the driving planning apparatus may calculate a cost function for the pedestrian, compare the cost function with a threshold value, and may determine, on the basis of the comparison, whether or not to generate the stop line. The cost function may be calculated on the basis of one or more of a vertical distance and a vertical speed of the pedestrian to a driving route. When the driving route is in a longitudinal direction, the vertical distance and vertical speed of the pedestrian to the driving route may refer to a lateral distance and lateral speed of the pedestrian. In other words, the driving planning apparatus may calculate the cost function by considering how far the pedestrian is from the driving route in a lateral direction and how fast the pedestrian moves in the lateral direction.

In an embodiment, the driving planning apparatus may calculate the cost function by considering a cost according to the vertical distance of the pedestrian to the driving route and a cost according to the vertical speed of the pedestrian to the driving route. The driving planning apparatus may consider factors other than the costs and is not limited thereto.

In an embodiment, when considering the costs, the driving planning apparatus may acquire the vertical distance of the pedestrian to the driving route via a parameter based on a Frenet frame described above.

In an embodiment, when calculating the cost according to the vertical distance of the pedestrian to the driving route, the driving planning apparatus may consider one or more of the vertical distance of the pedestrian to the driving route and a variance of the vertical distance. In addition, when calculating the cost according to the vertical speed of the pedestrian to the driving route, the driving planning apparatus may consider one or more of a normal walking speed (slow and fast walking) of the pedestrian, the vertical speed of the pedestrian to the driving route, and a variance of the vertical speed.

In an embodiment, the driving planning apparatus may calculate the cost function in the form of a Gaussian distribution. In detail, the driving planning apparatus may calculate the cost function in the form of a Gaussian distribution, on the basis of the vertical distance of the pedestrian to the driving route, the vertical speed of the pedestrian to the driving route, and other factors.

In an embodiment, the driving planning apparatus may generate a stop line in operation 1050 when the cost function is greater than or equal to a threshold value, and may not generate the stop line in operation 1060 when the cost function is less than the threshold value.

As described above, the driving planning apparatus may add reasonable limited factors to a method of decelerating by determining whether or not to generate the stop line, on the basis of the cost function and generating the stop line.

FIGS. 11 to 13 are example views of implementations of a method of setting a region of interest and determining whether or not to generate a virtual stop line, according to an embodiment.

Referring to FIG. 11, as described above in operations 1020 and 1030 of FIG. 10, a driving planning apparatus may generate a virtual stop line 1113 in response to determining that a pedestrian 1111 is located in a first region 1112. According to a method of generating a virtual stop line, according to the disclosure, the driving planning apparatus may generate the virtual stop line 1113 in advance from when a vehicle is at a long distance from the pedestrian 1111, decelerate, and approach, and thus may stop without rapid deceleration even when generating the virtual stop line 1113 by determining that the pedestrian 1111 is located in the first region 1112 at a short distance.

FIG. 12 illustrates an example view of an implementation when a vehicle is at a long distance from a target crosswalk, and FIG. 13 illustrates an example view of an implementation when a vehicle is at a short distance from a target crosswalk.

Hereinafter, referring to a comparison of FIGS. 12 and 13, a driving planning apparatus may set a margin of a region of interest to be great when a distance to a target crosswalk is long, and thus, the region of interest may increase. In addition, the driving planning apparatus may generate a virtual stop line in advance and approach when the distance to the target crosswalk is greater than or equal to a certain distance (at a long distance) for a pedestrian located in a second location within the region of interest, i.e., in a region outside a crosswalk, and may not generate a virtual stop line and pass through the target crosswalk when the distance to the target crosswalk is less than the certain distance (at a short distance).

Meanwhile, even when being at a short distance, the driving planning apparatus may generate the virtual stop line in advance at a long distance and decelerate, and thus may not pass near the target crosswalk at a high speed and may promote safety.

Referring back to FIG. 5, in an embodiment, the driving planning apparatus may detect the most proximate object 540. The most proximate object 540 refers to a proximate object closest to the vehicle 500, from among proximate objects traveling on the driving route 510, and refers to an object that is present inside the region of interest 560.

Meanwhile, the driving planning apparatus may acquire behavior prediction information of the proximate objects 520, 530, 540, and 550 together when detecting the proximate objects 520, 530, 540, and 550. The behavior prediction information refers to information obtained by predicting a near future behavior of an object by considering both location and speed information of the object.

The location of the vehicle 500 may not be ahead of a location of the most proximate object 540, and thus, the driving planning apparatus needs to consider the location and behavior of the most proximate object 540 when planning the driving speed of the vehicle 500. Therefore, when the most proximate object 540 is detected, the driving planning apparatus may plan the driving speed of the vehicle 500 on the basis of the behavior prediction information of the most proximate object 540.

In an embodiment, the driving planning apparatus may set relevance of the proximate objects 520, 530, 540, and 550 on the basis of the region of interest 560. The relevance may be numerical values reflecting correlations between the vehicle 500 and the proximate objects 520, 530, 540, and 550 and may be indicators indicating how much the driving planning apparatus needs to consider locations and behaviors of the proximate objects 520, 530, 540, 550 when planning the driving speed. For example, when a distance 521 of the proximate object 520 to the driving route is close, the driving planning apparatus needs to assign a weight to and reflect the location and behavior of the corresponding proximate object 520 when planning the driving speed, and thus may set the relevance of the corresponding proximate object 520 to be high.

Similarly, when a distance (not shown) of the proximate object 550 to the driving route is long, or when the proximate object 550 is not present in the region of interest 560, the driving planning apparatus may not consider the location and behavior of the corresponding proximate object 550 at all or may assign considerably little weight to and reflect the location and behavior of the corresponding proximate object 550, when planning the driving speed. Accordingly, when the proximate object 550 is not present within the region of interest 560, the driving planning apparatus may set the relevance of the corresponding proximate object 550 to 0.

Meanwhile, the driving planning apparatus may acquire a distance 522 to the driving route by reflecting widths of the vehicle 500 and the proximate object 520, 530, 540, and 550. For example, the driving planning apparatus may acquire the distance 522 of the proximate object 520 to the driving route other than a space occupied by the volume of each object.

The driving planning apparatus may improve safety and ride comfort by setting relevance with other objects and determining the degree of deceleration/acceleration according to the continuous relevance, rather than decelerating/accelerating with a sense of difference by simply determining, in a binary method, whether or not the other objects are included in a region of interest, when planning the driving speed of the vehicle.

In an embodiment, when the proximate objects 520, 530, and 540 are present within the region of interest 560, the driving planning apparatus may set the relevance to be inversely proportional to the distances of the proximate objects 520, 530, and 540 to the driving route. For example, as illustrated in FIG. 5, the distance (not shown) of the particular proximate object 530 to the driving route is closer than the distance 521 of another proximate object 520 to the driving route, and thus, the driving planning apparatus may set the relevance of the proximate object 530 to be higher than the relevance of the other proximate object 520 to be inversely proportional to each of the distances to the driving route.

In an embodiment, when the most proximate object 540 is detected, the driving planning apparatus may set the relevance of the most proximate object 540 to 1. Accordingly, as described above, the driving planning apparatus may plan the driving speed of the vehicle 500 to maintain a safe distance from the most proximate object 540 by maximally reflecting the location and behavior of the most proximate object 540.

Referring back to FIG. 4, in an embodiment, the pedestrians 410, 420, 430, and 440 may have pedestrian intention vectors and pedestrian intentions respectively corresponding to the pedestrians 410, 420, 430, and 440.

The pedestrian intention vectors may be normalized vectors obtained by estimating a probability distribution for the plurality of intentions that a pedestrian may have, and may be vectors having dimensions corresponding to the plurality of intentions. In addition, the pedestrian intentions may be estimate values of intentions of the pedestrians 410, 420, 430, and 440, may be unobservable, and may be defined in a discrete space in which the number of actions is finite.

In an embodiment, the plurality of intentions may include a first intention to cross the driving route of the vehicle 400. For example, when the driving planning apparatus determines that the certain pedestrian 430 is highly likely to intend to cross the driving route of the vehicle 400, on the basis of a lateral location and longitudinal location, and a lateral speed and longitudinal speed according to coordinates of the pedestrian 430, the driving planning apparatus may calculate a high value for a first intention of a pedestrian intention vector of the corresponding pedestrian 430.

In an embodiment, the plurality of intentions may include a second intention to wait without crossing the driving route of the vehicle 400. For example, when the driving planning apparatus determines that the certain pedestrian 410 is highly likely to intend to wait without crossing the driving route of the vehicle 400, on the basis of a lateral location and longitudinal location, and a lateral speed and longitudinal speed according to coordinates of the pedestrian 410, the driving planning apparatus may calculate a high value for a second intention of a pedestrian intention vector of the corresponding pedestrian 410.

In an embodiment, the plurality of intentions may include a third intention excluding the first intention and the second intention. For example, when the driving planning apparatus determines that the pedestrians 420 and 440 are highly likely to have intentions, which are not factors to be considered for traveling of the vehicle 400, on the basis of the lateral locations and longitudinal locations and the lateral speeds and longitudinal speeds according to the coordinates of the certain pedestrians 420 and 440, except for the intention to cross the driving route of the vehicle 400 and the intention to wait without crossing the driving route of the vehicle 400, the driving planning apparatus may calculate high values for third intentions of pedestrian intention vectors of the pedestrians 420 and 440.

In an embodiment, the driving planning apparatus may estimate or determine, as a pedestrian intention, an intention corresponding to a maximum value of a pedestrian intention vector. For example, when the first intention is referred to as "CROSSING", the second intention is referred to as "WAIT", and the third intention is referred to as "NONE", the pedestrian intention vector may be defined as {CROSSING, WAIT, NONE}. When the driving planning apparatus estimates a pedestrian intention of the certain pedestrian 430 around the vehicle 400 and determines that the pedestrian intention is highly likely to be an intention to cross the driving route of the vehicle 400, a pedestrian intention vector of the corresponding pedestrian 430 may be calculated as {0.8, 0.15, 0.05}, and, from among the plurality of intentions (CROSS, WAIT, NONE) of the pedestrian intention vector, the first intention corresponding to the maximum value of 0.8 may be estimated or determined as a pedestrian intention of the corresponding pedestrian 430.

FIG. 14 is a conceptual diagram of a method of determining a driving speed by using estimation of a pedestrian intention, according to an embodiment.

Referring to FIG. 14, a driving planning apparatus may include a recognition module (observer) 1410, a pedestrian intention estimation module (pedestrian intention estimator) 1420, and a driving speed determination module (motion planner) 1430. For convenience of description, respective modules are described as performing separate functions, but the respective modules may perform the same function or may not be separate modules.

In an embodiment, the recognition module 1410 may recognize a pedestrian around a vehicle, acquire recognition data 1440 and state data 1440, and transmit the recognition data 1440 and the state data 1440 to the pedestrian intention estimation module 1420.

In an embodiment, the recognition module 1410 may detect objects including other vehicles and a pedestrian around the vehicle, recognize the pedestrian by identifying the pedestrian from among the detected objects, and transmit the recognition data 1440 and the state data 1440 to the pedestrian intention estimation module 1420.

In an embodiment, the recognition module 1410 may acquire the state data 1440 in a state space. The state data 1440 refers to all information regarding a current state of a surrounding environment. In other words, at one point in time, the surrounding environment and the state data 1440 may have the same significance. For example, the state space may include coordinate information including a lateral location and longitudinal location of the pedestrian, and speed information including a lateral speed and longitudinal speed of the pedestrian.

In addition, the state space may include a pedestrian intention (not shown) of the pedestrian at a current point in time. In detail, the pedestrian intention (not shown) at the current point in time may refer to a pedestrian intention estimated by the driving planning apparatus at a previous point in time. The description of the previous point in time and the current point in time is given below.

In an embodiment, the recognition module 1410 may acquire the recognition data 1440 in a recognition (or observation) space. The recognition data 1440 may be a subset of the state data 1440, and may not have some information compared to the state data 1440. For example, the recognition space may include the coordinate information including the lateral location and longitudinal location of the pedestrian, and the speed information including the lateral speed and longitudinal speed of the pedestrian. In contrast, unlike the state space, the recognition space may be unobservable, and a pedestrian intention defined in a discrete space may not be included in the recognition space.

In an embodiment, the pedestrian intention estimation module 1420 may update a pedestrian intention vector via at least one of the recognition data 1440 and the state data 1440 received from the recognition module 1410.

In an embodiment, the driving planning apparatus may determine an update period. The update period may refer to a period in which a driving speed of a vehicle is determined by updating a pedestrian intention. When the update period is determined, a point in time at which the recognition module 1410 acquires the recognition data 1440 and the state data 1440 may be determined, and a point in time at which the pedestrian intention estimation module 1420 updates a pedestrian intention vector or estimates a pedestrian intention 1450 may be determined. In other words, acquiring, by the recognition module 1410, the recognition data 1440 and the state data 1440 may refer to acquiring the state data 1440 at a current point in time and the recognition data 1440 at the current point in time.

Meanwhile, a point at which one update period passes from a current point in time may be defined as a next point in time, and a point in time before one update period on the basis of the current point in time may be defined as a previous point in time. Accordingly, when the driving planning apparatus determines the update period, a next point in time may be acquired.

In an embodiment, the pedestrian intention estimation module 1420 may update a pedestrian intention vector at a current point in time to a pedestrian intention vector at a next point in time, on the basis of the update period.

For example, the pedestrian intention estimation module 1420 may apply the Bayes' Rule to update the pedestrian intention vector at the current point in time to the pedestrian intention vector at the next point in time. The Bayes' Rule is a rule that represents a relationship between a pre-probability and a post-probability of two probability variables. When using the Bayes' Rule, the post-probability including uncertainty may be calculated from the pre-probability for finding out a value by observation. Therefore, the pedestrian intention estimation module 1420 may update the pedestrian intention vector at the current point in time to the pedestrian intention vector at the next point in time by calculating the pedestrian intention vector at the next point in time from the recognition data 1440 at the current point in time and/or the pedestrian intention vector at the current point in time by using the Bayes' Rule.

For example, the pedestrian intention estimation module 1420 may calculate a probability of state data at a next point in time being acquired, on the basis of an observation probability function using the recognition data 1440 at the current point in time as an input and a transition probability function using the state data 1440 at the current point in time as an input.

The transition probability function refers to a function for calculating a probability of state data at a next point in time being acquired with respect to the state data 1440 at the current point in time. In detail, the transition probability function may be a function for calculating a conditional probability of state data at a next point in time being acquired by using the state data 1440 at the current point in time as a sample space. Accordingly, the transition probability function may be a function related to state data at a current point in time and a pedestrian intention vector at a current point in time.

The observation probability function refers to a function for calculating a probability of the recognition data 1440 at the current point in time being acquired with respect to state data at the next point in time. In detail, the observation probability function may be a function for calculating a conditional probability of the recognition data 1440 at the current point in time being acquired, by using the state data at the next point in time as the sample space.

In an embodiment, the transition probability function and the observation probability function may be functions designed experientially by using a Gaussian distribution. Alternatively, the observation probability function may be a function designed on the basis of a performance indicator of the recognition module 1410, such as cognitive performance for a pedestrian, a standard deviation, and a degree of noise.

In summary, the pedestrian intention estimation module 1420 may calculate the probability of the state data at the next point in time being acquired with respect to the recognition data 1440 at the current point in time and the pedestrian intention vector at the current point in time.

In an embodiment, the pedestrian intention estimation module 1420 may update the pedestrian intention vector at the current point in time to the pedestrian intention vector at the next point in time, on the basis of the calculated probability of the state data at the next point in time being acquired. The pedestrian intention vector at the next point in time is a vector for estimating a probability distribution for a plurality of intentions that a pedestrian may have at a next time point.

In an embodiment, the driving planning apparatus may update the pedestrian intention vector at the current point in time to the pedestrian intention vector at the next point in time, on the basis of a pedestrian behavior model. The pedestrian behavior model is a model for analyzing characteristics and behavior pattern of a pedestrian and predicting a behavior at a next point in time on the basis of a behavior at a current point in time. In detail, when using a pedestrian behavior model present in correspondence to each pedestrian intention, a behavior at a next point in time may be predicted for a pedestrian intention vector, and probabilities for a plurality of intentions may be calculated from a transition probability function and an observation probability function, on the basis of the predicted behavior.

The driving planning apparatus may determine a probability of each of a plurality of intentions of the pedestrian at a next point in time, on the basis of the pedestrian behavior model and update the pedestrian intention vector via the same. In other words, the driving planning apparatus may design the transition probability function by using the pedestrian behavior model, and may update the pedestrian intention vector.

In an embodiment, the pedestrian intention estimation module 1420 may estimate the pedestrian intention 1450 at the next point in time, on the basis of the updated pedestrian intention vector and transmit the estimated pedestrian intention 1450 at the next point in time to the driving speed determination module 1430.

For example, the pedestrian intention estimation module 1420 may estimate, as the pedestrian intention 1450 at the next point in time, an intention corresponding to a maximum value of the updated pedestrian intention vector. In detail, when the pedestrian intention vector is defined as {CROSSING, WAIT, NONE} and a pedestrian intention vector of a pedestrian at a next point in time is {0.8, 0.15, 0.05}, the pedestrian intention 1450 of the corresponding pedestrian at the next point in time may be "CROSSING".

FIG. 15 is a view illustrating first to third intentions of a pedestrian according to an embodiment.

A driving planning apparatus may recognize, around a vehicle 1500, a pedestrian 1530 estimated to be a first intention, a pedestrian 1510 estimated to be a second intention, and pedestrians 1520 and 1540 estimated to be a third intention. The same descriptions of the vehicle 1500 and the pedestrians 1510, 1520, 1530, and 1540 of FIG. as the descriptions of the vehicle 400 and the pedestrians 410, 420, 430, and 440 of FIG. 4 are omitted herein.

The driving planning apparatus needs to consider intentions of the pedestrians 1510, 1520, 1530, and 1540 when determining a driving speed of the vehicle 1500, to provide a safe driving plan to all of a passenger and the pedestrians 1510, 1520, 1530, and 1540.

The pedestrian 1530 estimated to be the first intention is highly likely to be located on a driving route of the vehicle 1500 at a next point in time, on the basis of a lateral location and longitudinal location of the pedestrian 1530 at a current point in time and a lateral speed and longitudinal speed of the pedestrian 1530 at the current point in time, and thus, a first intention of a pedestrian intention vector calculated on the basis of a pedestrian behavior model may have a maximum value.

As described above, on the basis of information of the pedestrian 1510 at a current point in time, a probability is low that the pedestrian 1510 estimated to be the second intention is located on the driving route of the vehicle 1500 at a next point in time, but there is a predetermined probability that the pedestrian 1510 is located on the driving route at a short distance or a close point in time from the driving route, and thus, a second intention of the pedestrian intention vector calculated on the basis of the pedestrian behavior model may have a maximum value.

On the basis of information of the pedestrians 1520 and 1540 at a current point in time, there is no probability that the pedestrians 1520 and 1540 estimated to be the third intention are located on the driving route of the vehicle 1500 at a next point in time, or the pedestrians 1520 and 1540 may have a speed in an opposite direction to the driving route, and thus, the third intention does not need to be considered for planning a driving speed of the vehicle 1500. Therefore, the third intention of the pedestrian intention vector calculated on the basis of the pedestrian behavior model may have a maximum value.

In an embodiment, the driving planning apparatus may estimate an intention corresponding to the maximum value of the pedestrian intention vector, i.e., a pedestrian intention of the pedestrian 1530 at a next point in time, as the first intention, a pedestrian intention of the pedestrian 1510 at the next point in time as the second intention, and a pedestrian intention of the pedestrians 1520 and 1540 at the next point in time as the third intention.

In an embodiment, a driving speed determination module may determine a driving speed of a vehicle by considering a pedestrian intention at a next point in time, which is received from a pedestrian intention estimation module.

For example, the driving speed determination module may determine weighted values of the pedestrians 1510, 1520, 1530, and 1540 from an estimated pedestrian intention and determine the driving speed of the vehicle on the basis of the weighted values of the pedestrians 1510, 1520, 1530, and 1540.

Referring to FIG. 15, the driving planning apparatus may determine to assign a greater weight to the pedestrian 1530 estimated to be the first intention than the pedestrian 1510 estimated to be the second intention. In addition, the driving planning apparatus may determine to assign a greater weight to the pedestrian 1510 estimated to be the second intention than the pedestrians 1520 and 1540 estimated to be the third intention.

The weights assigned to the pedestrians 1510, 1520, 1530, and 1540 may determine how much a behavior of a corresponding pedestrian is reflected when determining the driving speed of the vehicle 1500. In an embodiment, acceleration and deceleration may be conservatively determined for the pedestrian 1530 estimated to be the first intention, the driving speed may be determined, with uncertainty, for the pedestrian 1510 estimated to be the second intention, and the driving speed may be determined with relatively little or no consideration of behaviors of the pedestrian 1520 and 1540 estimated to be the third intention.

In an embodiment, the driving planning apparatus may repeat the above-described operations or the above-described embodiment every point in time determined on the basis of an update period. For example, the driving planning apparatus may recognize the pedestrians 1510, 1520, 1530, and 1540 every point in time to acquire recognition data at a current point in time and state data at the current point in time, via the same, estimate a probability distribution for a plurality of intentions that the pedestrians 1510, 1520, 1530, and 1540 may have at a next point in time to update a pedestrian intention vector, estimate a pedestrian intention at a next point in time on the basis of the updated pedestrian intention vector, and determine the driving speed of the vehicle 1500 by considering the same. The driving planning apparatus may travel up to a next point in time according to the determined driving speed, repeat the above operation at the next point in time, and determine a driving speed of the vehicle 1500 at a point in time after two update periods pass on the basis of a current point in time. Accordingly, the driving planning apparatus may determine a driving speed so that the intentions of the pedestrians 1510, 1520, 1530, and 1540 changing every point in time are reflected.

In an embodiment, when "Cross" refers to a first intention, "Wait" refers to a second intention, and "None" refers to a third intention, the driving planning apparatus may determine a driving speed by assigning the greatest weight to a pedestrian estimated to be the first intention. In addition, the driving planning apparatus may determine the driving speed by assigning a greater weight to a pedestrian estimated to be the second intention than a pedestrian estimated to be the third intention, and the driving planning apparatus may determine the driving speed by assigning the smallest weight to the pedestrian estimated to be the third intention. In other words, the driving planning apparatus may determine the driving speed by assigning a conservative weight to the pedestrian estimated to be the first intention and assigning a weight, which rapidly decreases with an increase in a distance from the vehicle 1500, to the pedestrian estimated to be the third intention. However, a method by which the driving planning apparatus determines a weight with respect to a pedestrian is not limited thereto.

FIG. 16 is a view illustrating a method of planning a driving speed of a vehicle on the basis of behavior prediction information of a most proximate object, according to an embodiment.

Referring to FIG. 16, from among objects traveling on a driving route of a vehicle 1610, a most proximate object 1620 may be present inside a region of interest. Here, in an embodiment, an apparatus may determine a reference location profile 1650 on the basis of at least one of a standard location profile 1630 of the vehicle 1610, behavior prediction information of the most proximate object 1620, and a relevance of the most proximate object 1620.

In detail, when the most proximate object 1620 is present, the apparatus may derive a corrected location profile 1650 by correcting the standard location profile 1630 on the basis of the relevance or the behavior prediction information of the most proximate object 1620, and may determine the reference location profile 1650 by using the corrected location profile 1650. In the present embodiment according to FIG. 16, one proximate object 1620 is present, and thus, the corrected location profile 1650 may be determined as the reference location profile 1650.

A location profile refers to a profile in which a change in displacement of any object over time is reflected by setting a time axis and a displacement axis to an x-axis and a y-axis, respectively.

Meanwhile, a location profile of a proximate object, a most proximate object, and an $N^{th}$ periphery object described below may refer to a location profile corrected by reflecting a safety distance between a corresponding object and a vehicle in a behavior prediction profile in which behavior prediction information of the corresponding object is expressed as a time-displacement graph. For example, as illustrated in FIG. 16, a location profile 1640 of the most proximate object 1620 may refer to a location profile obtained by correcting a behavior prediction profile 1641 of the most proximate object 1620, in which the behavior prediction information of the most proximate object 1620 is expressed as the time-displacement graph, by reflecting the safety distance between the vehicle 1610 and the most proximate object 1620.

The standard location profile 1630 may refer to a location profile in which a current driving speed of the vehicle 1610 is reflected. Alternatively, the standard location profile 1630 may refer to a location profile corresponding to an appropriate speed for the vehicle 1610 to travel (e.g., a speed corresponding to a certain percentage of a maximum speed limit set with respect to a road on which the vehicle 1610 is traveling) when a proximate object is not present around the vehicle 1610 or a proximate object is not present within the region of interest. In other words, the standard location profile 1630 may refer to a location profile when the vehicle 1610 travels at a desired speed.

The corrected location profile 1650 refers to a location profile obtained by correcting the standard location profile 1630 by reflecting the behavior prediction information of each proximate object 1620 when the proximate object 1620 is present around the vehicle 1610. In other words, the corrected location profile 1650 corresponds to a location profile corrected by each proximate object, and thus, when a plurality of proximate objects are present except for a most proximate object, a plurality of corrected location profiles corresponding to the number of proximate objects may be derived. A method of deriving a plurality of corrected location profiles is described below in detail with reference to FIGS. 19 and 20.

The reference location profile 1650 refers to a location profile obtained by correcting the standard location profile 1630 by considering behavior prediction information of all of the proximate objects 1620 when the proximate objects 1620 are present around the vehicle 1610. In an embodiment, the apparatus may determine one reference location profile 1650 by using all of the derived corrected location profiles 1650.

In an embodiment, the apparatus may determine the standard location profile 1630 of the vehicle 1610 and determine the reference location profile 1650 on the basis of the standard location profile 1630 and the behavior prediction information of the most proximate object 1620. For example, when a point in time at which the standard location profile 1630 meets the location profile 1640 of the most proximate object 1620 derived from the behavior prediction information of the most proximate object 1620 is defined as $t_1$, the apparatus may determine the reference location profile 1650 to match, from a current point in time to $t_1$, the standard location profile 1630 and to match, after $t_1$, the location profile 1640 of the most proximate object 1620.

Safe traveling without collision with other objects may be enabled by determining a final location profile (not shown) described below by referring to the determined reference location profile 1650.

FIGS. 17 and 18 are views illustrating a process of deriving a corrected location profile on the basis of a relevance of a proximate object, according to an embodiment.

FIG. 17 illustrates a process of determining a reference location profile on the basis of the relevance when a driving planning apparatus sets the relevance of a proximate object to 0.4.

When the driving planning apparatus detects a proximate object stopped at a certain distance in a lateral direction 20 m ahead of a current location of a vehicle, the driving planning apparatus may acquire a location profile 1711 of the proximate object as shown in a graph of FIG. 17. Here, the driving planning apparatus may derive a corrected location profile 1710 obtained by correcting a standard location profile on the basis of the relevance of the proximate object.

In an embodiment, the driving planning apparatus may derive the corrected location profile 1710 so that the standard location profile is 40% close to the location profile 1711 of the proximate object. For example, when a point in time at which the standard location profile meets the location profile of the proximate object is defined as $t_1$, the driving planning apparatus may derive the corrected location profile 1710 to be 40% close to the standard location profile from a current point in time to $t_1$ and to be 40% close to the location profile 1711 of the proximate object after $t_1$.

One proximate object is present within a region of interest, and thus, the driving planning apparatus may determine the derived corrected location profile 1710 as a reference location profile.

FIG. 18 illustrates a process of determining a reference location profile on the basis of a relevance when a driving planning apparatus sets the relevance of a proximate object to 0.8.

In an embodiment, when the driving planning apparatus detects a proximate object stopped at a certain distance in a lateral direction 20 m ahead of a current location of a vehicle, the driving planning apparatus may acquire a location profile 1821 of the proximate object as shown in a graph of FIG. 18.

Here, the driving planning apparatus may derive a corrected location profile 1820 so that a standard location profile is 80% close to the location profile 1821 of the proximate object. For example, when a point in time at which the standard location profile meets the location profile 1821 of the proximate object is defined as $t_2$, the driving planning apparatus may derive the corrected location profile 1820 to be 80% close to the standard location profile from a current point in time to $t_2$ and to be 80% close to the location profile 1821 of the proximate object after $t_2$.

One proximate object is present within a region of interest, and thus, the driving planning apparatus may determine the derived corrected location profile 1820 as a reference location profile.

FIGS. 19 and 20 are views illustrating a process of determining a reference location profile in an environment in which a plurality of proximate objects are present, according to an embodiment.

An apparatus may detect proximate objects 1910, 1920, and 1930 including the most proximate object 1930 within a region of interest of a vehicle 1900. For convenience of description, hereinafter, the most proximate object 1930 is defined as a first proximate object, and the proximate objects 1910 and 1920 other than the most proximate object 1930 are defined as second proximate objects.

In an embodiment, the apparatus may derive one or more corrected location profiles 1911 and 1921 by correcting a standard location profile 1901 on the basis of behavior prediction information and relevance of the first proximate object 1930 and the one or more second proximate objects 1910 and 1920. The corrected location profiles 1911 and 1921 respectively correspond to the second proximate objects 1910 and 1920.

The apparatus considers the standard location profile 1901, a location profile of the second proximate object 1910, and a location profile of the most proximate object 1930 to derive the corrected location profile 1911 corresponding to the second proximate object 1910. Accordingly, a point in time at which the standard location profile 1901 meets the location profile of the second proximate object 1910 is defined as $t_1$ and a point in time at which the standard location profile 1901 meets the location profile of the most proximate object 1930 is defined as $t_3$.

The apparatus may derive the corrected location profile 1911 by correcting the standard location profile 1901 from a current point in time to $t_1$, correcting, from $t_1$ to $t_3$, a location profile corrected to correspond to behavior prediction information of the second proximate object 1910 in proportion to the relevance of the second proximate object 1910, and correcting, after $t_3$, the standard location profile 1901 to correspond to behavior prediction information of the most proximate object 1930. In an embodiment, when the relevance of the second proximate object 1910 is 0.2, the standard location profile 1901 may be corrected to be 20% close to the location profile of the second proximate object 1910 from $t_1$ to $t_3$. Simultaneously, when the relevance of the most proximate object 1930 is 1, the standard location profile 1901 may be corrected to correspond, at a ratio of 8:2, to the location profile of the most proximate object 1930 and the location profile of the second proximate object 1910 after $t_3$.

Similarly, the apparatus may derive the corrected location profile 1921 corresponding to the other second proximate object 1920. A point in time at which the standard location profile 1901 meets the location profile of the second proximate object 1920 is defined as $t_2$, and a point in time at which the standard location profile 1901 meets the location profile of the most proximate object 1930 is defined as $t_3$.

The apparatus may derive the corrected location profile 1921 by correcting the standard location profile 1901 from a current point in time to $t_2$, correcting, from $t_2$ to $t_3$, a location profile corrected to correspond to behavior prediction information of the second proximate object 1920 in proportion to the relevance of the second proximate object 1920, and correcting, after $t_3$, the standard location profile 1901 to correspond to the behavior prediction information of the most proximate object 1930. In an embodiment, when the relevance of the second proximate object 1920 is 0.6, the standard location profile 1901 may be corrected to be 60% close to the location profile of the second proximate object 1920 from $t_1$ to $t_3$. Simultaneously, when the relevance of the most proximate object 1930 is 1, the standard location profile 1901 may be corrected to correspond, at a ratio of 6:4, to the location profile of the most proximate object 1930 and the location profile of the second proximate object 1910 after $t_3$.

Referring to FIG. 20, the apparatus may determine a reference location profile 2040 by using the one or more corrected location profiles 2011 and 2021 corresponding to the first proximate object and the one or more second proximate objects 2010 and 2020.

According to an embodiment of deriving the corrected location profiles 2011 and 2021 with reference to FIG. 20, any displacement value of each of the corrected location profiles 2011 and 2021 may be less than or equal to any displacement value of the standard location profile 2001. As described above, the apparatus may determine the reference location profile 2040 so that any displacement value of the reference location profile 2040 is always less than or equal to any displacement value of each of the corrected location profiles 2011 and 2021.

In an embodiment, when a point in time at which the corrected location profiles 2011 and 2021 meet each other is defined as t*, the apparatus may divide a time into five durations on the basis of $t_1$, $t_2$, t*, and $t_3$ and determine the reference location profile 2040 to match, in each duration, a location profile having a minimum displacement value, from among of the standard location profile 2001 and the one or more corrected location profiles 2011 and 2021.

In detail, the apparatus may determine the reference location profile 2040 to match the standard location profile 2001 from a current point in time to $t_1$, to mach the corrected location profile 2011 having a minimum displacement value, in a duration from $t_1$ to $t_2$ and a duration from $t_2$ to t*, and to match the corrected location profile 2021 having a minimum displacement value, in a duration from t* to $t_3$ and a duration after $t_3$.

A method by which a driving planning apparatus determines a reference location profile when a most proximate object (a first proximate object) and one or more second proximate objects are detected within a region of interest is described below with reference to the embodiments described above. For convenience of description, the second proximate objects are redefined as a first periphery object, a second periphery object, . . . , and an $N^{th}$ periphery object in an order close to a front side of a vehicle, and a corrected location profile corresponding to the $N^{th}$ periphery object is defined as an $N^{th}$ corrected location profile. Here, N is a natural number corresponding to the number of second proximate objects.

The apparatus may derive the $N^{th}$ corrected location profile by correcting a location profile of the $N^{th}$ periphery object to correspond to behavior prediction information of the $N^{th}$ periphery object in proportion to a relevance of the $N^{th}$ periphery object from a point in time at which the location profile of the $N^{th}$ periphery object meets the standard location profile and correcting a location profile of a most proximate object to correspond to behavior prediction information of the most proximate object after a point in time at which the location profile of the most proximate object meets the standard location profile.

In addition, the apparatus may divide a time domain into a plurality of durations on the basis of one or more points in time at which the location profile of the $N^{th}$ periphery object meets the standard location profile and a point in time at which one or more $N^{th}$ corrected location profiles meet each other (when N is 1, there is no point in time at which the $N^{th}$ corrected location profiles meet), and may determine the reference location profile to correspond, in each of the durations, to a location profile having a minimum displacement value, from among the standard location profile, the one or more $N^{th}$ corrected location profiles, and the location profile of the most proximate object.

In an embodiment, when the most proximate object is not detected within a region of interest, the apparatus may derive the $N^{th}$ corrected location profile by correcting the location profile of the $N^{th}$ periphery object to correspond to the behavior prediction information of the $N^{th}$ periphery object in proportion to the relevance of the $N^{th}$ periphery object from a point in time at which the location profile of the $N^{th}$ periphery object meets the standard location profile.

In addition, the apparatus may determine the reference location profile to match a location profile having a minimum displacement value, from among the standard location profile and the one or more $N^{th}$ corrected location profiles, in each of the plurality of durations divided from the time domain on the basis of the one or more points in time at which the location profile of the $N^{th}$ periphery object meets the standard location profile and the point in time at which the one or more $N^{th}$ corrected location profiles meet each other (when N is 1, there is no point in time at which the $N^{th}$ corrected location profiles meet each other).

FIG. 21 is an example view illustrating a final location profile according to an embodiment.

In an embodiment, an apparatus may determine a final location profile 2120 corresponding to a reference location profile 2110.

The final location profile 2120 refers to a location profile indicating a final driving speed at which a vehicle 2100 actually travels.

In an embodiment, the apparatus may calculate a cost function on the basis of the derived reference location profile 2110. The cost function is a function representing a relationship with a variable related to a cost derived from a location profile in which the vehicle 2100 travels. The variable related to the cost may be identified via each term of the cost function.

In an embodiment, the apparatus may calculate the cost function on the basis of an error cost corresponding to a displacement difference from the reference location profile 2110, an acceleration cost corresponding to acceleration of the vehicle 2100, and an acceleration change amount cost corresponding to a jerk of the vehicle 2100.

The error cost corresponds to a cost according to a difference between the reference location profile 2110 and the location profile in which the vehicle 2100 travels. The reference location profile 2110 is a minimum location profile for traveling without colliding with periphery objects, and thus, an increase in the above difference affects safety of traveling. Therefore, the error cost may be associated with the safety of traveling.

The acceleration cost corresponds to a cost due to acceleration derived from the location profile in which the vehicle 2100 travels. The large size of acceleration refers to rapid acceleration and rapid deceleration, and thus, the acceleration cost may be associated with not only the safety of traveling but also ride comfort.

The acceleration change amount cost corresponds to a cost due to the jerk of the vehicle 2100. The jerk corresponds to a cost representing a change in acceleration over time. When the vehicle 2100 travels, an instantaneous impact amount due to a change in acceleration occurs, and when the jerk increases, the ride comfort due to the instantaneous impact amount decreases. Accordingly, the acceleration change amount cost may be associated with the ride comfort.

In an embodiment, the apparatus may determine a location profile minimizing the cost function as a final location profile. For example, the apparatus may perform iterative calculations to find the location profile minimizing the cost function, and may determine a solution derived from the result of the calculation as the final location profile.

Meanwhile, the apparatus may determine the reference location profile and the final location profile for a certain time. The certain time may refer to a particular time to plan a driving speed, and may be a predetermined time, or may be a time that varies on the basis of a driving speed of a vehicle and the number of periphery objects. For example, when the number of proximate objects increases, a traffic volume increases and complexity of plan of a driving speed increases, and thus, the apparatus may secure the safety of traveling by setting the certain time to be long.

FIG. 22 is an example view schematically illustrating a process of optimizing a trajectory of a vehicle, according to an embodiment.

Referring to FIG. 22, an environment for optimizing a trajectory of a vehicle, according to the disclosure, may include a reference trajectory 2210, driving information 2220, a model predictive control (MPC) module 2230, a control input 2240, and a vehicle 2250.

The reference trajectory 2210 may refer a route through which the vehicle 2250 needs to travel. In other words, the reference trajectory 2210 may be a driving route determined by a driving planning apparatus, according to the embodiments described above. Alternatively, the reference trajectory 2210 may be a driving route acquired on the basis of a driving speed determined by the driving planning apparatus, according to the embodiments described above.

In an embodiment, the reference trajectory 2210 may include a global route corresponding to a route from a starting point of the vehicle 2250 to a destination and a local route corresponding to a certain forward route for avoiding an unexpected non-fixed obstacle.

The optimal control input 2240 or an optimal trajectory described below may refer to a control input or trajectory for the vehicle 2250 to travel without departing from the reference trajectory 2210.

In an embodiment, the reference trajectory 2210 may refer to a local route.

The driving information 2220 may include all information related to a driving state of the vehicle 2250, such as a current location, a current control state, a current speed, and the received control input 2240 of the vehicle 2250. The driving information 2220 may refer to a current state variable of the vehicle 2250.

The control input 2240 refers to an input for controlling a steering angle of a steering wheel. When the control input 2240 is input to the vehicle 2250, a DC motor for rotating the steering wheel and an encoder for reading the steering angle of the steering wheel may be connected to each other by a gear.

The MPC module 2230 refers to a module for determining the optimal control input 2240 for the vehicle 2250. MPC refers to a method for optimal control for generating an optimized control command by inputting motion of an object and a surrounding environment condition into a cost function. The MPC module 2230 may select the optimal control input 2240 by calculating a plurality of expected trajectories according to one or more control inputs and calculating a cost function. The MPC module 2230 may use an iterative linear quadratic regulator (iLQR) algorithm when selecting the optimal control input 2240.

The iLQR algorithm may be an algorithm that approximates a non-linear function to a linear function and a non-quadric function to a quadratic function through Taylor approximation, and may calculate an optimal trajectory from an initial state to a target state by efficiently optimizing a cost function.

In the disclosure, a driving planning apparatus may acquire or determine the reference trajectory 2210 and the driving information 2220 of the vehicle 2250, and may input, into the vehicle 2250, the control input 2240 determined via the MPC module 2230. Hereinafter, a method by which a driving planning apparatus optimizes a trajectory of a vehicle is described below in detail with reference to FIGS. 23 to 25.

FIG. 23 is a view illustrating a process in which a driving planning apparatus calculates an expected trajectory, according to an embodiment.

Referring to FIG. 23, an apparatus may calculate a plurality of expected trajectories 2301, 2302, 2303, and 2304 according to one or more control inputs 2310 and select an optimal control input from among the one or more control inputs 2310.

In an embodiment, the apparatus may determine a plurality of model prediction time points including a current time point by using a prediction reference horizon 2320 and a control period 2330.

The prediction reference horizon 2320 refers to the number of future outputs to be predicted, and is a future period that may be predicted by a model. The prediction reference horizon 2320 corresponds to the number of future control inputs (control horizons) to be predicted.

In an embodiment, the apparatus may determine a $0^{th}$ time point corresponding to the current time point to an $N^{th}$ time point corresponding to a last time point of the prediction reference horizon 2320, on the basis of the control period 2330. N is a natural number greater than or equal to 2, and the control period 2330 refers to an interval between time points. In other words, the apparatus may determine, as an interval of the control period 2330, the $0^{th}$ time point corresponding to the current time point to the $N^{th}$ time point corresponding to the last time point of the prediction reference horizon 2320. Here, N may correspond to a natural number obtained by dividing the prediction reference horizon 2320 by the control period 2330.

The apparatus may calculate the plurality of expected trajectories 2301, 2302, 2303, and 2304 on the basis of the plurality of model prediction time points.

An expected trajectory may vary according to a control input at the plurality of model prediction time points, and thus, the apparatus may generate one or more control inputs 2310 at each of the plurality of model prediction time points, and may calculate the plurality of expected trajectories 2301, 2302, 2303, and 2304 according to the one or more control inputs 2310.

In an embodiment, the apparatus may generate the plurality of expected trajectories 2301, 2302, 2303, and 2304 by inputting the one or more control inputs 2310 into a prediction model. In an embodiment, an iLQR-based MPC module may select an optimal control input of minimizing a cost function via iterative calculations, and here, future movement of a vehicle may be determined by using the prediction model. Accordingly, a prediction model according to an embodiment is described below in detail with reference to FIGS. 24 and 25.

FIGS. 24 and 25 are views illustrating a prediction model for a driving planning apparatus to select an optimal control input, according to an embodiment.

FIG. 24 illustrates a kinematic bicycle model having a control point on a rear wheel axle, and FIG. 25 illustrates a kinematic bicycle model having a control point on a front wheel axle. A rotation radius is much larger than wheels of a vehicle at most vehicle driving speeds, and thus, a bicycle model may be used.

Referring to FIG. 24, when a control point is on a rear wheel axle, an apparatus may apply an instantaneous center of rotation (ICR) and calculate a state change rate with respect to the control point. In detail, the apparatus may derive a steering angle through a rotation rate, a rotation radius, a length, and the like of the bicycle model and calculate, via the derived steering angle, the state change rate with respect to the control point.

Similarly, referring to FIG. 25, even when a control point is on a front wheel axle, the apparatus may calculate a state change rate with respect to the control point. Here, unlike the illustration in FIG. 24, the state change rate may vary due to a difference in the control point.

In addition, the prediction model may correspond to a kinematic bicycle model having a control point at the center of gravity, and the prediction model is not limited to the kinematic bicycle model.

FIG. 26 is a view illustrating a process in which a driving planning apparatus non-uniformly sets control periods 2610 and 2620, according to an embodiment.

In an embodiment, an apparatus may determine a plurality of model prediction time points by non-uniformly setting the control periods 2610 and 2620. For example, the apparatus may determine a reference time 2650 and non-uniformly set the control period 2610 and 2620 on the basis of the reference time 2650.

In general, higher control performance is needed for safety of traveling, with respect to a proximate front of a prediction reference horizon of a local route. However, when the control periods 2610 and 2620 decreases, an amount of computation increases, and thus, setting the control periods 2610 and 2620 to be short with respect to a relatively long distance may not be efficient. Therefore, according to the present embodiment, reasonable trajectory optimization may be achieved by setting the short control period 2610 with respect to a super-close front and the long control period 2620 with respect to a subsequent prediction reference horizon.

The reference time 2650 refers to a point in time at which the control periods 2610 and 2620 are changed. The reference time 2650 may be set on the basis of demanded control performance, and efficiency according to an amount of computation.

In an embodiment, the apparatus needs to regenerate a reference trajectory 2630 by using a speed profile, in the non-uniform control periods 2610 and 2620, and thus, the reference trajectory 2630 may be a trajectory generated by interpolating a local route on the basis of a speed profile. For example, the apparatus may calculate time information regarding a $i^{th}$ time point, calculate a distance to be traveled according to time information calculated by a vehicle at a $i^{th}$ time point, and generate a reference trajectory by using the corresponding distance. Accordingly, the reference trajectory may be a trajectory in which a speed profile of a vehicle is reflected.

In an embodiment, the apparatus may adjust the reference time 2650 in response to determining that the vehicle enters an environment demanding control performance that is higher than or equal to a threshold value. For example, when determining that the vehicle enters an unexpected obstacle-rich or rough terrain such as an unpaved road, the apparatus may be adjust the reference time 2650 to be longer. As another example, when determining that the vehicle enters a very heavy traffic and congested road, the apparatus may adjust the reference time 2650 to be longer. Accordingly, an unexpected accident may be prevented by applying high control performance up to a farther time point on the prediction reference horizon.

In an embodiment, the apparatus may analyze a global route, and adjust the reference time 2650 in response to determining that the vehicle travels along the global route on which control performance higher than or equal to the threshold value is demanded. For example, when determining that an unpaved road or a rough terrain is present on a global route and thus high control performance is demanded when analyzing the global route corresponding to a route from a starting point to a destination, the apparatus may adjust the reference time 2650 to be longer before traveling.

The apparatus may set the short control period 2610 from an $0^{th}$ time point to the reference time 2650 and set the long control period 2620 from the reference time 2650 to an $N^{th}$ time point. For example, referring to FIG. 26, the control periods 2610 and 2620 may be non-uniformly set to $dt_{short}$ and $dt_{long}$, on the basis of the reference time 2650 $h_{short}$ that is one point in time on the prediction reference horizon. Therefore, a plurality of expected trajectories 2640 according to a control input of an interval $dt_{short}$ that is the short control period 2610 may be calculated from the $0^{th}$ time point to the h short 2650, and the plurality of expected trajectories 2640 according to a control input of an interval $dt_{long}$ that is the long control period 2620 may be calculated from the $h_{short}$ 2650 to the $N^{th}$ time point.

In an embodiment, the apparatus may adjust the control periods 2610 and 2620 in response to determining that the vehicle enters an environment in which control performance higher than or equal to the threshold value is demanded or travels on the global route in which control performance higher than or equal to the threshold value is demanded. For example, as described above, when determining that the global route corresponds to an obstacle-rich or rough terrain or a congested road or the vehicle enters the corresponding environment, the apparatus may adjust the control periods 2610 and 2620 to be shorter.

Referring back to FIG. 23, the apparatus may calculate a cost function on the basis of at least one of the reference trajectory 2303, the plurality of expected trajectories 2301, 2302, 2303, and 2304, and the one or more control inputs 2310.

From among the one or more control inputs 2310, the control input when the cost function has a minimum value may be determined as an optimal control input, and thus, a method of setting the cost function in a process of optimizing a vehicle trajectory may be very significant. Therefore, a cost function, which may guarantee both ride comfort and safety, needs to be set.

In an embodiment, the cost function may include an error cost, an input cost, and a change amount cost.

In detail, the apparatus may calculate the error cost on the basis of the reference trajectory 2303. The error cost may correspond to a cost according to a difference between the reference trajectory 2303 in which the vehicle needs to travel and a trajectory in which the vehicle actually travels. The great difference between the reference trajectory 2303 and the trajectory to be traveled may affect driver and pedestrian safety, and thus, the difference from the reference trajectory 2303 may be minimized for safety. For example, the apparatus may calculate the error cost on the basis of a difference between the reference trajectory 2303 and an expected trajectory.

In addition, the apparatus may calculate the input cost on the basis of a control input. The input cost may correspond to a cost of inputting the control input. Controlling a steering angle of a steering wheel while traveling may affect ride comfort, and thus, a control input may be minimized for the ride comfort. For example, the apparatus may calculate the input cost on the basis of the control input.

In addition, the apparatus may calculate the change amount cost on the basis of an amount of change in the control input. The change amount cost may correspond to a cost according to the steering angle of the steering wheel. The great steering angle of the steering wheel may affect the ride comfort, and thus, the amount of change in the control input may be minimized for the ride comfort.

In an embodiment, the apparatus may calculate the cost function by considering a weighted value of each of the error cost, the input cost, and the change amount cost. The weighted value may be set by considering which of traveling safety and ride comfort is to be given a greater weight.

In an embodiment, the weighted values of the error cost, the input cost, and the change amount cost may adaptively change according to the behavior of the vehicle. For example, when the speed of the vehicle is slow and fast, the expected trajectories 2301, 2302, 2303, and 2304 according to the control input 2310, safety, and ride comfort vary, and thus, the weighted value may be a function that may change in real time and/or adaptively according to the behavior of the vehicle such as the speed of the vehicle, rather than a constant.

In an embodiment, the cost function may further include constraint conditions regarding the control input and/or the amount of change in the control input.

In an embodiment, the apparatus may select an optimal control input from among the one or more control inputs 2310. For example, the apparatus may calculate a plurality of expected trajectories via a prediction model, calculate a cost function of each of the plurality of expected trajectories, and select, as the optimal expected trajectory 2301, an expected trajectory at which the cost function is minimized. Here, a control input via which the optimal expected trajectory 2301 is calculated may correspond to an optimal control input.

Meanwhile, as described above with reference to FIG. 22, the apparatus may use an iLQR algorithm to select the optimal control input via the prediction model and the cost function.

In an embodiment, the apparatus may repeat the operations described above every control period 2330 to optimize a trajectory of the vehicle. For example, the apparatus may delete a control input at an M+1$^{st}$ time point to an N$^{th}$ time point, in response to selecting an optimal control input at an M$^{th}$ time point (M is a natural number greater than or equal to 1 and less than or equal to N−1). Accordingly, the apparatus may select a new optimal control input every time point and thus exhibit high control performance.

FIG. 27 is a flowchart of a method of generating a virtual stop line, according to an embodiment.

The method of generating the virtual stop line, illustrated in FIG. 27, is related to the embodiments described above, and thus, the above descriptions thereof, which are omitted herein, may also be applied to the method of FIG. 27.

Operations illustrated in FIG. 27 may be executed by the autonomous driving apparatus described above. In detail, the operations illustrated in FIG. 27 may be executed by a processor included in the autonomous driving apparatus described above.

In operation 2710, an apparatus may determine a target crosswalk from among one or more crosswalks on a driving route.

In an embodiment, the apparatus may determine, as the target crosswalk, a most approximate crosswalk in front of the driving route.

In operation 2720, the apparatus may set a region of interest for the target crosswalk and may set the region of interest by using a margin of the region of interest.

In an embodiment, the apparatus may set the margin of the region of interest by using the target crosswalk. The margin of the region of interest may include a longitudinal margin and a lateral margin.

In an embodiment, the apparatus may acquire a distance to the target crosswalk, acquire a width and crossing length of the target crosswalk, set the longitudinal margin on the basis of the width and the distance to the target crosswalk, and set the lateral margin on the basis of the crossing length and the distance to the target crosswalk.

In an embodiment, when the distance to the target crosswalk is long, the margin of the region of interest may be set to be greater, and when the distance to the target crosswalk is short, the margin of the region of interest may be set to be smaller.

In operation 2730, the apparatus may determine whether or not to generate a virtual stop line, on the basis of a location of a pedestrian within the region of interest.

In an embodiment, when a first region corresponds to a region inside the target crosswalk and a second region corresponds to an intersection between a region outside the target crosswalk and a region inside the region of interest, the apparatus may determine to generate the virtual stop line, in response to determining that the pedestrian is located in the first region and may determine, on the basis of the distance to the target crosswalk, whether or not to generate the virtual stop line, in response to determining that the pedestrian is located in the second region.

In an embodiment, the apparatus may determine to generate the virtual stop line when the distance to the target crosswalk is longer than or equal to a certain distance, and may determine not to generate the virtual stop line when the distance to the target crosswalk is less than the certain distance.

In an embodiment, the apparatus may calculate a cost function for the pedestrian, compare the cost function with a threshold value, and determine whether or not to generate the virtual stop line, on the basis of the result of the comparison.

In an embodiment, the cost function may be calculated on the basis of one or more of a vertical distance and a vertical speed of a pedestrian with respect to the driving route.

FIG. 28 is a block diagram of an apparatus for generating a virtual stop line, according to an embodiment.

In an embodiment, the apparatus for generating the virtual stop line may refer to the same apparatus as a driving planning apparatus described above.

Referring to FIG. 28, an apparatus 2800 for generating a virtual stop line (hereinafter, referred to as an apparatus) may include a communicator 2810, a processor 2820, and a database (DB) 2830. FIG. 28 illustrates that the apparatus 2800 includes only components related to an embodiment. Therefore, it may be understood by those skilled in the art that other general-purpose components may be further included, in addition to the components illustrated in FIG. 28.

The communicator 2810 may include one or more components that enable wired/wireless communication with an external server or an external apparatus. For example, the communicator 2810 may include at least one of a short-range communicator (not shown), a mobile communicator (not shown), and a broadcast receiver (not shown). In an embodiment, the communicator 2810 may receive traffic information and may use the received traffic information to recognize a crosswalk on a driving route.

The DB 2830 may be hardware for storing various types of data processed within the apparatus 2800, and may store programs for processing and controlling by the processor 2820.

The DB 2830 may include random access memory (RAM), such as dynamic random access memory (DRAM) and static random access memory (SRAM), read-only memory (ROM), electrically erasable programmable read-only memory (EEPROM), CD-ROM, Blu-ray or other optical disk storages, a hard disk drive (HDD), a solid state drive (SSD), or flash memory.

The processor 2820 controls overall operation of the apparatus 2800. For example, the processor 2820 may generally control an input unit (not shown), a display (not shown), the communicator 2810, the DB 2830, and the like by executing the programs stored in the DB 2830. The processor 2820 may control an operation of the apparatus 2800 by executing the programs stored in the DB 2830.

The processor 2820 may control at least some of operations of an autonomous driving apparatus and/or a driving planning apparatus described above with reference to FIGS. 1 to 27.

The processor 2820 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electrical units for performing other functions.

In an embodiment, the apparatus 2800 may be an electronic apparatus having mobility. For example, the apparatus 2800 may be implemented as a smartphone, a tablet personal computer (PC), a PC, a smart TV, a personal digital assistant (PDA), a laptop computer, a media player, a navigation system, a device having a camera mounted thereon, and other mobile electronic devices. In addition, the apparatus 2800 may be implemented as a wearable device, such as a watch, glasses, a hair band, and a ring having a communication function and a data processing function.

In an embodiment, the apparatus 2800 may be an electronic apparatus embedded in a vehicle. For example, the apparatus 2800 may be an electronic apparatus inserted into a vehicle via tuning after a production process thereof. Here, locations of the apparatus 2800 and the vehicle (or the autonomous vehicle) described above may be the same as each other.

In an embodiment, the apparatus 2800 may be a server located outside a vehicle. The server may be implemented as a computer apparatus or a plurality of computer apparatuses that perform communication over a network to provide commands, codes, files, content, services, and the like. The server may receive data needed for generating a virtual stop line from apparatuses mounted on the vehicle, and may generate the virtual stop line on the basis of the received data.

In an embodiment, a process performed by the apparatus 2800 may be performed by at least some of an electronic apparatus having mobility, an electronic apparatus embedded in a vehicle, and a server located outside the vehicle.

According to the above-described problem solving means of the disclosure, even when a pedestrian suddenly enters a crosswalk, a vehicle may stop without large deceleration, and thus, a driving experience considering ride comfort may be provided.

In addition, the vehicle may respond to various environments on a road by determining whether or not to generate a stop line, according to an absolute location of the pedestrian and relative locations of the pedestrian and the vehicle.

Embodiments according to the disclosure may be implemented in the form of a computer program that may be executed on a computer via various types of components, and the computer program may be recorded on a computer-readable medium. Here, the medium may include magnetic media, such as a hard disk, a floppy disk, and a magnetic tape, optical recording media, such as CD-ROM and DVD, magneto-optical media, such as a floptical disk, and hardware devices, such as ROM, RAM, and flash memory devices specially configured to store and execute program instructions.

Meanwhile, the computer program may be specially designed and configured for the disclosure, or may be known to and used by those skilled in the art of the computer software field. Examples of the computer program may include not only machine language code generated by a compiler but also high-level language code that may be executed by a computer by using an interpreter or the like.

According to an embodiment, the method according to various embodiments may be included and provided in computer program products. The computer program products may be traded between sellers and buyers as commodities. The computer program products may be distributed in the form of device-readable storage media (e.g., compact disc read only memory (CD-ROM)), or may be distributed (e.g., downloaded or uploaded) online via an application store (e.g., Play Store™) or between two user devices. When distributed online, at least a portion of a computer program product may be at least temporarily stored or temporarily generated in a device-readable storage medium such as a server of a manufacturer, a server of an application store, or a memory of a relay server.

The operations constituting the method according to the disclosure may be performed in any appropriate order unless an order of the operations is explicitly stated or stated to the contrary. The disclosure is not necessarily limited according to the order of description of the operations. The use of all examples or example terms (e.g., and the like) in the disclosure is simply to describe the disclosure in detail, and the scope of the disclosure is limited due to the examples or example terms unless limited by claims. In addition, those skilled in the art may appreciate that various modifications, combinations, and changes may be made according to design conditions and factors within the scope of the appended claims or equivalents thereof.

Therefore, the spirit of the disclosure should not be determined while limited to the embodiments described above, and all scopes equivalent to or equivalently changed from the claims as well as the claims described below should fall within the scope of the spirit of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of generating a virtual stop line, the method comprising:

determining a target crosswalk from among one or more crosswalks on a driving route of an autonomous vehicle;

setting a region of interest for the target crosswalk;

determining whether or not to generate a virtual stop line, on the basis of a location of a pedestrian within the region of interest and controlling speed of the autonomous vehicle based on the determination of whether or not to generate the virtual stop line, wherein a first region corresponds to a region inside the target crosswalk and a second region corresponds to an intersection of a region outside the target crosswalk and a region inside the region of interest, wherein the determining whether or not to generate a virtual stop line comprises:

in response to determining that the pedestrian is located in the first region, determining to generate the virtual stop line;

in response to determining that the pedestrian is located in the second region, comparing a distance between the autonomous vehicle and the target crosswalk with a certain distance;

determining to generate the virtual stop line when the distance between the autonomous vehicle and the target crosswalk is greater than or equal to the certain distance, and determining not to generate the virtual stop when the distance between the autonomous vehicle and the target crosswalk is less than the certain distance, wherein the controlling speed of the autonomous vehicle comprises:

reducing the speed of the autonomous vehicle only when the virtual stop line is generated.

2. The method of claim 1, wherein the determining of the target crosswalk comprises:

recognizing the one or more of the crosswalks; and determining, as the target crosswalk, a most proximate crosswalk in front of the driving route.

3. The method of claim 1, wherein the setting of the region of interest comprises:

setting a margin of the region of interest by using the target crosswalk; and setting the region of interest by using the margin of the region of interest.

4. The method of claim 3, wherein the margin of the region of interest includes a longitudinal margin and a lateral margin, and the setting of the margin of the region of interest further comprises:

acquiring the distance between the autonomous vehicle and the target crosswalk;

acquiring a width and a crossing length of the target crosswalk;

setting the longitudinal margin on the basis of the width and the distance between the autonomous vehicle and the target crosswalk; and setting the lateral margin on the basis of the crossing length and the distance between the autonomous vehicle and the target crosswalk.

5. The method of claim 3, wherein the setting of the margin of the region of interest comprises:

setting the margin of the region of interest to be greater when the distance between the autonomous vehicle and the target crosswalk is longer, and setting the margin of the region of interest to be smaller when the distance between the autonomous vehicle and the target crosswalk is shorter.

6. The method of claim 1, wherein the determining of whether or not to generate the virtual stop line comprises:

in response to determining that the pedestrian is located in the first region, determining to generate the virtual stop line;

wherein the first region corresponds to the region inside the target crosswalk.

7. The method of claim 1, wherein the determining of whether or not to generate the virtual stop line comprises:

calculating a cost function for the pedestrian;

comparing the cost function with a threshold value; and determining whether or not to generate the virtual stop line, on the basis of a result of the comparison.

8. The method of claim 7, wherein the cost function is calculated on the basis of one or more of a vertical distance or a vertical speed of the pedestrian with respect to the driving route.

9. A non-transitory computer-readable recording medium having recorded thereon a program for executing the method of claim 1 on a computer.

10. An apparatus for generating a virtual stop line, the apparatus comprising:

a memory storing at least one program; and a processor configured to, by executing the at least one program:

wherein the processor configured to:

determine a target crosswalk from among one or more crosswalks on a driving route of an autonomous vehicle;

set a region of interest for the target crosswalk;

determine whether or not to generate a virtual stop line, on the basis of a location of a pedestrian within the region of interest; and control speed of the autonomous vehicle based on the determination of whether or not to generate the virtual stop line, wherein the processor is further configured to:

wherein a first region corresponds to a region inside the target crosswalk and a second region corresponds to an intersection of a region outside the target crosswalk and a region inside the region of interest, wherein the processor, in determining whether or not to generate a virtual stop line, performs:

in response to determining that the pedestrian is located in the first region, determining to generate the virtual stop line;

in response to determining that the pedestrian is located in the second region, comparing a distance between the autonomous vehicle and the target crosswalk with a certain distance;

determining to generate the virtual stop line when the distance between the autonomous vehicle and the target crosswalk is greater than or equal to the certain distance, and determining not to generate the virtual stop when the distance between the autonomous vehicle and the target crosswalk is less than the certain distance, wherein the processor is further configured to reduce the speed of the autonomous vehicle only when the virtual stop line is generated.

\* \* \* \* \*